(12) United States Patent
Björk

(10) Patent No.: US 12,099,775 B2
(45) Date of Patent: Sep. 24, 2024

(54) SYSTEMS AND METHODS FOR DISPLAYING A CURSOR ON ANOTHER USER DEVICE

(71) Applicant: SHOPIFY INC., Ottawa (CA)

(72) Inventor: Mårten Björk, Ottawa (CA)

(73) Assignee: SHOPIFY INC., Ottawa (CA)

( * ) Notice: Subject to any disclaimer, the term of this patent is extended or adjusted under 35 U.S.C. 154(b) by 31 days.

(21) Appl. No.: 16/882,642

(22) Filed: May 25, 2020

(65) Prior Publication Data

US 2021/0365231 A1 Nov. 25, 2021

(51) Int. Cl.
*G06F 3/14* (2006.01)
*G06F 3/0481* (2022.01)

(52) U.S. Cl.
CPC .......... *G06F 3/1454* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 5,649,104 | A * | 7/1997 | Carleton | G06F 3/038 348/E7.083 |
| 5,872,924 | A * | 2/1999 | Nakayama | G06F 3/1454 709/227 |
| 5,874,960 | A * | 2/1999 | Mairs | G09G 5/14 715/733 |
| 6,938,212 | B2 * | 8/2005 | Nakamura | G06F 16/954 715/752 |
| 7,624,192 | B2 * | 11/2009 | Meyers | H04L 67/36 380/270 |
| 7,870,496 | B1 * | 1/2011 | Sherwani | H04L 67/38 715/761 |
| 11,295,493 | B2 * | 4/2022 | Sanghai | G06F 16/904 |
| 2005/0050474 | A1 * | 3/2005 | Bells | G06F 8/38 715/788 |

(Continued)

FOREIGN PATENT DOCUMENTS

| | | |
|---|---|---|
| CN | 102934105 A | 2/2013 |
| CN | 111107116 A | 5/2020 |
| EP | 1574971 A1 | 9/2005 |

OTHER PUBLICATIONS

Wikipedia: Chrome Remote Desktop, (https://en.wikipedia.org/w/index.php?title=Chrome_Remote_Desktop&oldid=1036476184) (Year: 2011).*

(Continued)

*Primary Examiner* — Tamara T Kyle
*Assistant Examiner* — Koorosh Nehchiri

(57) ABSTRACT

It is sometimes necessary or desirable that a cursor on the screen of a first device be displayed on the screen of a second device. Methods are disclosed for displaying a cursor of a first user's device on the screen of a second user's device, even when the webpage displayed on the second user's device has a different layout from that webpage as displayed on the first user's device. In some embodiments, a first user's device transmits to the second user's device: an identity of an element on the webpage, and a distance measurement from a point associated with that element. The second user's device then displays the cursor on the screen of the second user's device at a location equal to the distance measurement from the point associated with the element.

26 Claims, 19 Drawing Sheets

(56) References Cited

U.S. PATENT DOCUMENTS

| | | | |
|---|---|---|---|
| 2005/0204296 A1* | 9/2005 | Rossler | G06F 16/954 715/752 |
| 2006/0036971 A1* | 2/2006 | Mendel | G06F 3/04812 715/862 |
| 2007/0118821 A1* | 5/2007 | Yee | G06T 11/206 345/660 |
| 2008/0184128 A1* | 7/2008 | Swenson | H04N 19/164 715/790 |
| 2009/0044133 A1* | 2/2009 | Goto | G06F 3/04845 715/754 |
| 2010/0017727 A1* | 1/2010 | Offer | H04L 65/1094 709/204 |
| 2011/0252339 A1* | 10/2011 | Lemonik | G06F 40/166 715/753 |
| 2013/0086155 A1* | 4/2013 | Thomas | G06F 9/541 709/203 |
| 2013/0113833 A1* | 5/2013 | Larsson | G06F 3/1462 345/619 |
| 2013/0125009 A1* | 5/2013 | DeLuca | H04L 67/08 715/740 |
| 2013/0159849 A1* | 6/2013 | Lee | H04L 9/30 715/272 |
| 2014/0184652 A1* | 7/2014 | Matel | G06F 3/1423 345/681 |
| 2014/0204026 A1* | 7/2014 | Liu | G06F 3/04812 345/158 |
| 2014/0267090 A1* | 9/2014 | Heyman | G06F 3/04886 345/173 |
| 2015/0220504 A1* | 8/2015 | Bocanegra Alvarez | G06F 40/169 715/233 |
| 2015/0324058 A1* | 11/2015 | Sarnoff | G06F 3/1454 345/173 |
| 2021/0149638 A1* | 5/2021 | McCulloh | G06F 16/16 |

OTHER PUBLICATIONS

Semantic Telepointers for Groupware, by Saul Greenberg, Carl Gutwin and Mark Roseman, Department of Computer Science, University of Calgary, Dec. 1996, Conference: Computer-Human Interaction, Proceedings., Sixth Australian Conference, (https://www.researchgate.net/publication/3671008_Semantic (Year: 1996).*

Collaborative Environment for Supporting Web Users, By Yoshinori Aoki, EEE International Conference On Systems, Man and Cybernetics, vol. 4, Oct. 7, 2001 (Oct. 7, 2001), pp. 2309-2316 (https://ieeexplore.ieee.org/stamp/stamp.jsp?tp=&arnumber=972901) (Year: 2001).*

Aoki, Yoshinori—Institute of Electrical and Electronics Engineers, "Collaborative Environment for Supporting Web Users". Published in 2001 IEEE International Conference On Systems, Man and Cybernetics. e-Systems and e-Man for Cybernetics in Cyberspace. vol. 4. Oct. 7, 2001. pp. 2309-2316.

Greenberg, Saul, et al. "Semantic Telepointers for Groupware". Published in Computer-Human Interaction, 1996, Proceedings. Sixth Australian Conference on Hamilton, New Zealand, Nov. 24-27, 1996. pp. 54-61.

European Search Report and Opinion issued on EP Application No. 21 15 9733, dated Aug. 9, 2021. 10 pages.

Summons to Attend Oral Proceedings Pursuant to Rule 115(1) EPC for European Patent Application No. 21 159 733.1-1203, dated Oct. 17, 2022. 10 pages.

* cited by examiner

E-Commerce Platform

Search

- ⌂ Home
- ⇥ Orders
- ◊ Products
- ○○ Customers
- ▦ Reports
- % Discounts
- ⊞ Apps

SALES CHANNELS ⊕
- ▭ Online Store
- ▯ Mobile App

View all channels

⚙ Settings

---

(JG) John's Apparel / Jonny B. Good

All channels ∨    Today ∨

TOTAL SALES
$98.00

$125
$75
$25

12am   8pm   4pm   11pm
         Jun 1
         2 orders

TOTAL SALES BY CHANNEL   View dashboard

Online Store        Jun 1
$0.00               0 orders

Mobile app
$0.00               0 orders

Shopify POS (126 York St.)
$0.00               0 orders

---

Good afternoon, Jonny B..

Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

FIG. 2

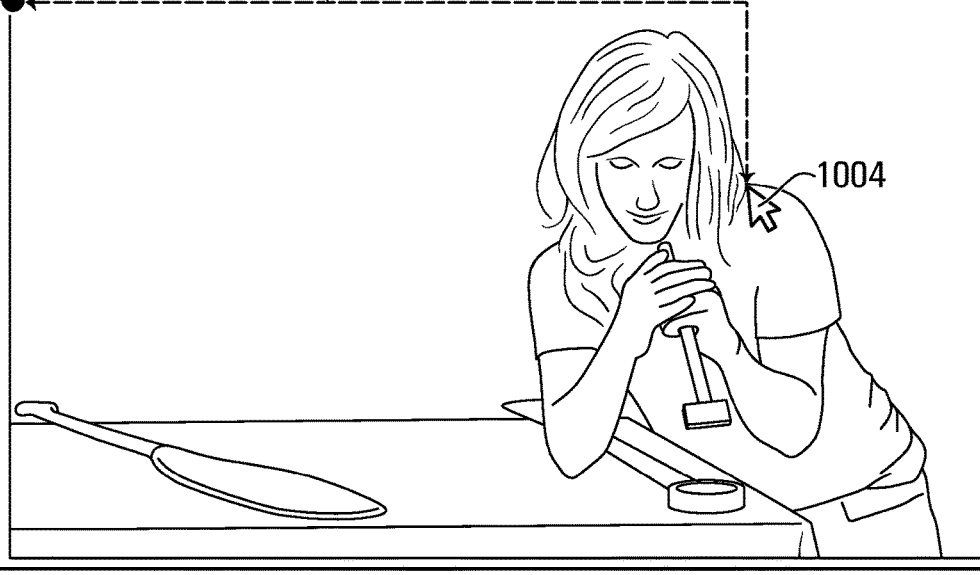
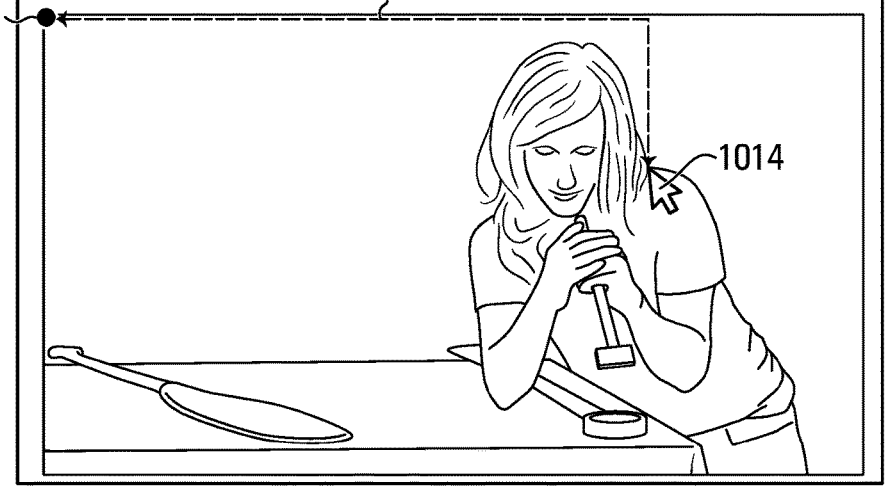
FIG. 11

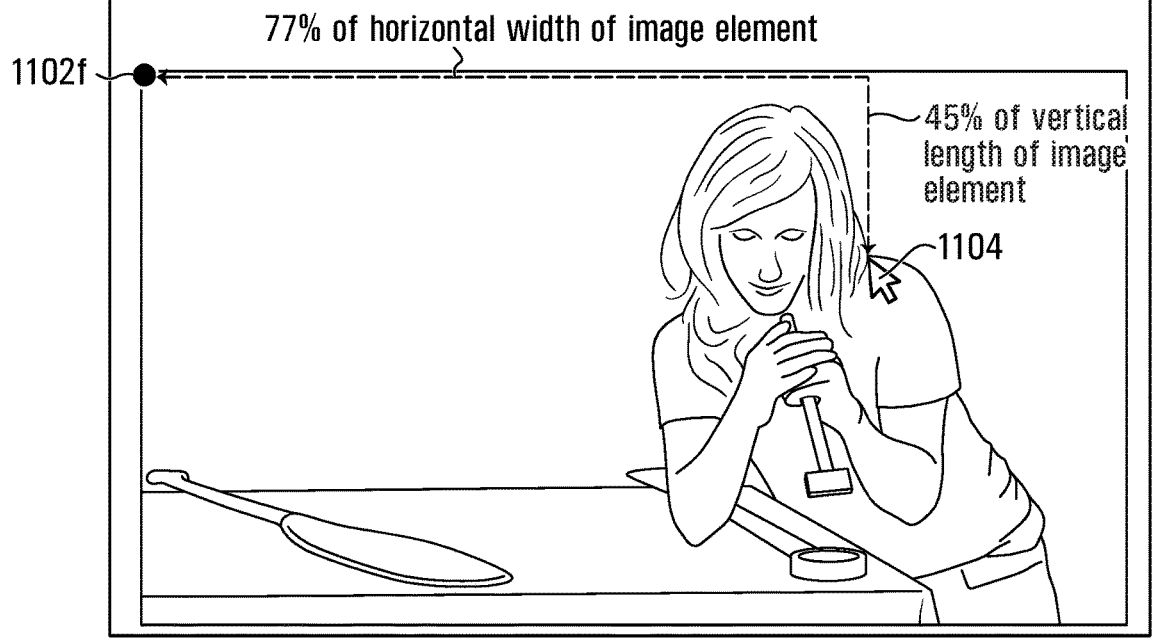
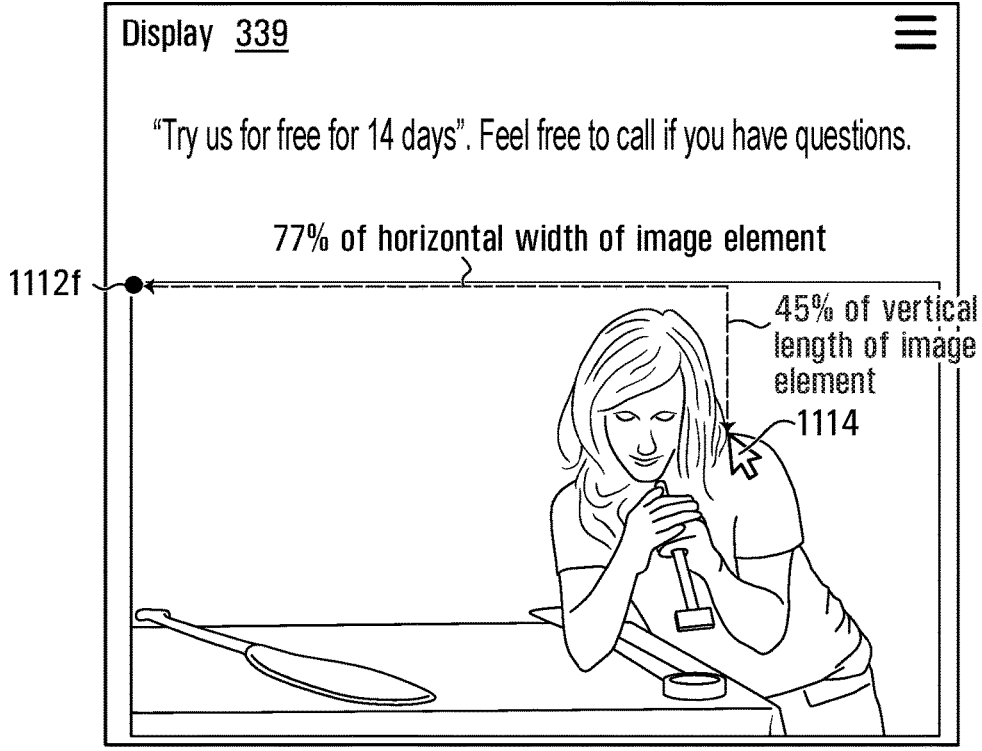
FIG. 12

SYSTEMS AND METHODS FOR DISPLAYING A CURSOR ON ANOTHER USER DEVICE

FIELD

The present application relates to displaying a cursor on the screen of another user's device.

BACKGROUND

It is sometimes necessary or desirable that a cursor on the screen of a first device be displayed on the screen of a second device.

One example is when multiple users are viewing and interacting with the same web application in real-time to collaborate. An action performed by a user on one device, such as hovering a mouse cursor over a particular element on the webpage, may need to be displayed on the screen of each other device. Another example is when a first user is remotely assisting a second user, e.g. showing the second user where to build, edit and/or navigate on a webpage. The cursor on the screen of the first user's device may need to be displayed on the screen of the second user's device.

A same webpage may have different layouts when rendered for display by web browsers of various devices. The specific layout generated by the browser is typically dependent on factors such as the screen resolution, the screen size, and/or the web browser window size. Therefore, different devices may generate different layouts of the same webpage. If a cursor of a first user's device is to be displayed correctly on the screen of the second user's device, i.e. over the correct visual webpage element, then that cursor may need to be positioned at a completely different location on the screen of the second user's device compared to the screen of the first user's device. The location on the screen may be measured relative to a coordinate system, e.g. a coordinate system having an origin at the top-left corner of the screen.

SUMMARY

Computer-implemented methods and systems are disclosed for displaying a cursor of a first user's device on the screen of a second user's device, even when the webpage displayed on the second user's device has a different layout from that same webpage as displayed on the first user's device.

In some embodiments, a first user's device transmits to the second user's device: an identity of an element on the webpage, and a distance measurement from a point (e.g. an anchor point) associated with that element. The second user's device then displays the cursor on the screen of the second user's device at a location equal to the distance measurement from the point associated with the element. In some embodiments, a web server hosting the webpage receives the identity of the webpage element and the distance measurement from the first user's device and transmits them to the second user's device.

In some embodiments, a method includes transmitting a webpage to a first user device for display on a screen associated with the first user device. The method further includes transmitting the webpage to a second user device for display on a screen associated with the second user device. The method further includes receiving from the first user device: an identity of an element on the webpage, and a distance measurement from a point associated with the element. The method further includes transmitting to the second user device: the identity of the element, the distance measurement, and an instruction to display a cursor on the screen associated with the second user device at a location equal to the distance measurement from the point associated with the element. In some embodiments, the instruction may be implicit or inherent, e.g. the second user device may be instructed by way of receipt of the identity of the element and the distance measurement.

In some embodiments, a method includes displaying a webpage on a screen associated with a user device. The method further includes receiving both (i) an identity of an element of the webpage and (ii) a distance measurement from a point associated with the element. The method further includes displaying on the screen, concurrently with the webpage, a cursor at a location equal to the distance measurement from the point associated with the element.

A cursor, as used herein, may instead be called a pointer. An example of a cursor is a mouse cursor.

BRIEF DESCRIPTION OF THE DRAWINGS

Embodiments will be described, by way of example only, with reference to the accompanying figures wherein:

FIG. 2 is an example of a home page of an administrator, according to one embodiment;

FIGS. 9 to 14 illustrate examples of measurements of relative distance between a cursor and an anchor point, according to various embodiments;

DETAILED DESCRIPTION

For illustrative purposes, specific example embodiments will now be explained in greater detail below in conjunction with the figures.

Example e-Commerce Platform

In some embodiments, the methods disclosed herein may be performed in relation to a commerce platform. A commerce platform will be referred to herein as an e-commerce platform. An example of an e-commerce platform is described below.

Figure 1:
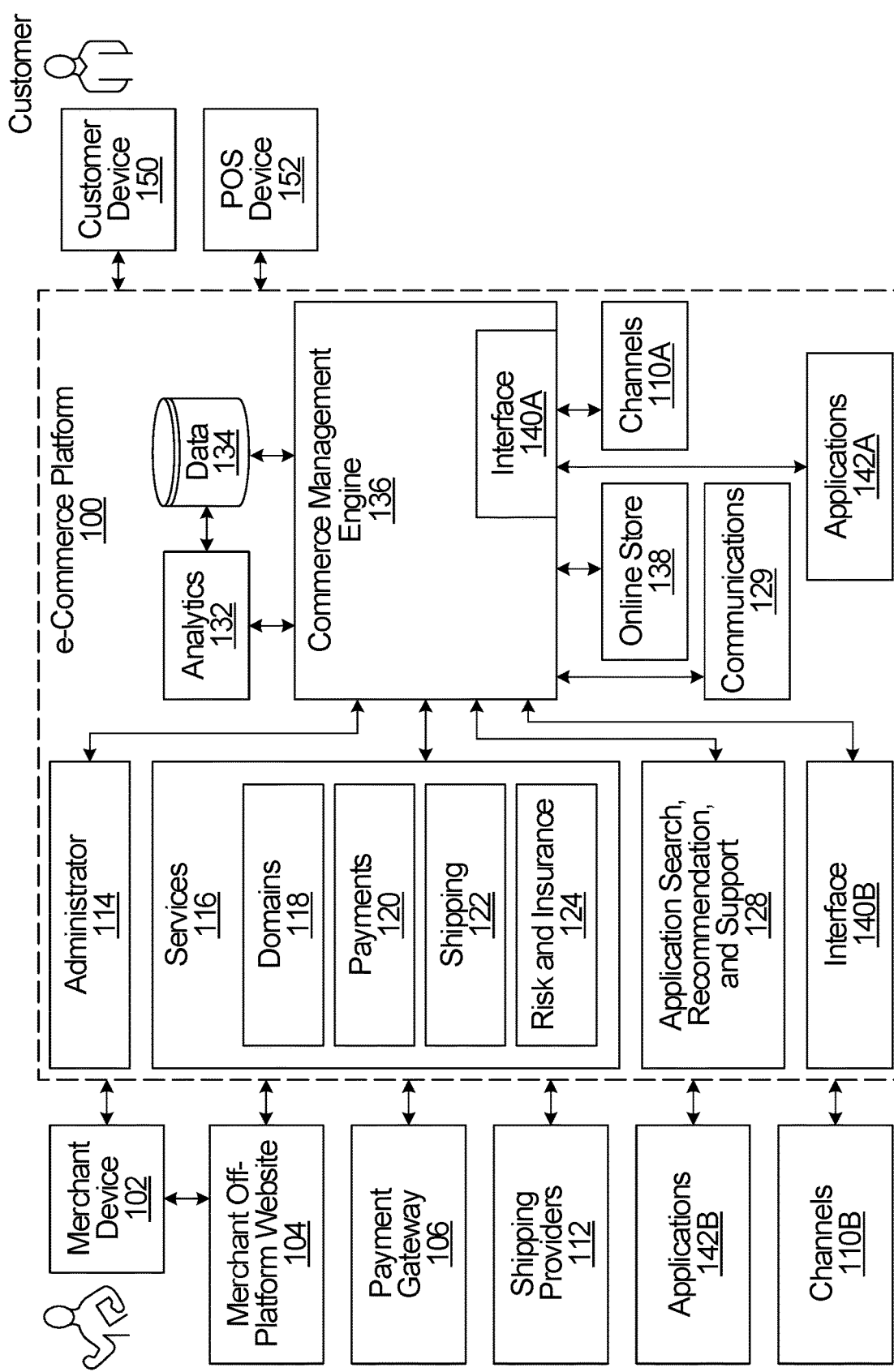
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Cursor Sharing on the e-Commerce Platform

It is sometimes necessary or desirable that a cursor on the screen of a first device be displayed on the screen of a second device, even in the context of e-commerce, e.g. even in relation to e-commerce platform 100. For example, a merchant associated with the e-commerce platform 100 may be remotely assisted by a support representative who is showing the merchant where to build, edit and/or navigate web resources such as a webpage. The web resource may be hosted on the e-commerce platform 100, e.g. on a web server included as part of the e-commerce platform 100. It may be desirable for the cursor on the support representative's screen to also be displayed on the merchant's screen. As another example, multiple employees of a same merchant may be viewing or collaborating to develop a same webpage, and may want to display their cursors on each other's screen.

The e-commerce platform 100 may therefore implement an application that provides for cursor sharing. For example, the application may cause the cursor of a first user's device to be displayed on the screen of the second user's device, e.g. via the cursor sharing methods described herein. The application may be executed by a processing device in the e-commerce platform 100.

However, although the embodiments described herein may be implemented in association with an e-commerce platform (e.g. e-commerce platform 100, as in FIG. 1), the embodiments described are not limited to implementation in an e-commerce platform or even in association with e-commerce. Rather, the embodiments described below may be implemented in any system in which a cursor of a first user's device is to be displayed on the screen of a second user's device. Therefore, the embodiments below will be described generally and not in relation to e-commerce.

Cursor Sharing Systems and Methods

Figure 3:
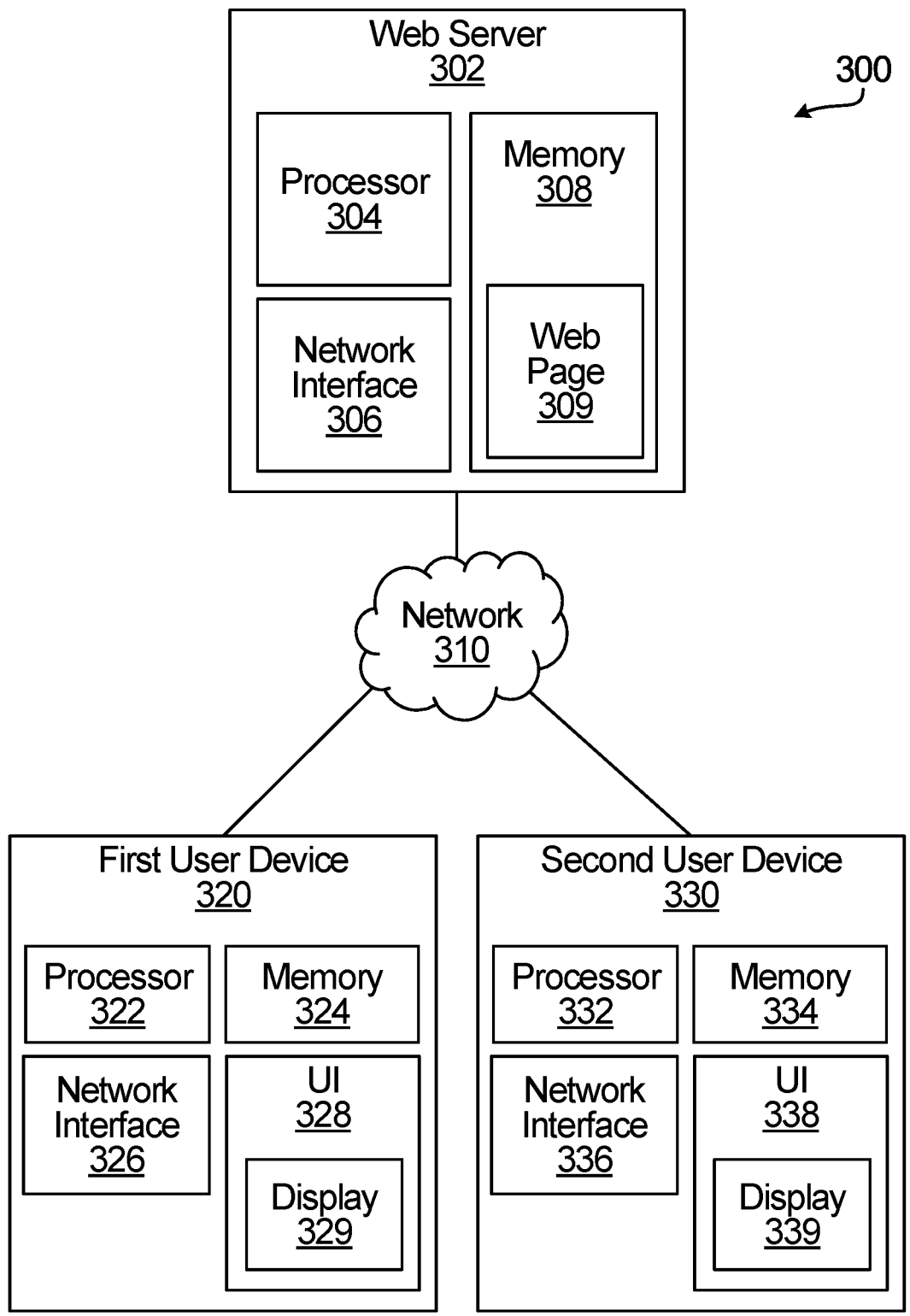
FIG. 3 is a block diagram illustrating a system for cursor sharing, according to one embodiment.

FIG. 3 illustrates a system 300 for cursor sharing, according to one embodiment. The system 300 includes a web server 302 connected to a first user device 320 and a second user device 330 over a network 310. Other user devices may also be connected to the web server 302 over the network 310, but have been omitted for the sake of clarity.

The web server 302 includes a memory 308 that stores a webpage 309 (an example of a web resource). The memory 308 may be or include ephemeral storage (e.g. random access memory (RAM)) and/or persisted storage (e.g. a hard drive, solid-state drive (SSD), or other non-transitory computer-readable medium, etc.). The webpage 309 is accessed (e.g. downloaded) by both the first user device 320 and the second user device 330 over the network 310. The web server 302 includes a network interface 306 to allow the web server 302 to interface with and communicate over the network 310. The network interface 306 may be implemented as a network interface card (NIC), and/or a computer port (e.g. a physical outlet to which a plug or cable connects), and/or a network socket, etc., depending upon the implementation. The web server 302 further includes a processor 304 for directly performing or controlling the web server 302 to perform the operations of the web server 302, e.g. transmitting the webpage 309 to the first user device 320 and the second user device 330, generating an instruction for transmission to the second user device 330, the instruction to display a cursor on the second user device's screen at a location equal to a distance measurement from a point (e.g. anchor point) associated with an element of the webpage 309, etc. The processor 304 may be implemented by one or more processors that execute instructions stored in a memory (e.g. in the memory 308) or stored in another non-transitory computer readable medium. Alternatively, some or all of the processor 304 may be implemented using dedicated circuitry, such as, for example, an application specific integrated circuit (ASIC), a graphics processing unit (GPU), or a programmed field programmable gate array (FPGA).

The first user device 320 may be a personal computer, laptop, tablet, or mobile device, etc., depending upon the implementation. The first user device 320 includes a processor 322, a memory 324, a network interface 326, and a user interface 328. The processor 322 directly performs, or instructs the first user device 320 to perform, the operations of the first user device 320 described herein, e.g. obtaining an identity of an element on the webpage 309 and a distance measurement from a point (e.g. an anchor point) associated with that element, and transmitting the identity of the element and the distance measurement to the web server 302. The processor 322 may be implemented by one or more general purpose processors that execute instructions stored in a memory (e.g. the memory 324) or stored in another non-transitory computer readable medium. The instructions, when executed, cause the processor 322 to directly perform, or instruct the first user device 320 to perform, the operations described herein. In other embodiments, the processor 322 may be implemented using dedicated circuitry, such as, for example, a programmed FPGA, a GPU, or an ASIC. The user interface 328 includes a display 329 having a screen (which may be a touch screen). The user interface 328 may include other components also, such as a keyboard, and/or a mouse, etc., depending upon the implementation. The processor 322 implements a browser for displaying the webpage 309 on the screen of the user interface 328 of the first user device 320. The network interface 326 is for communicating over the network 310. The structure of the network interface 326 will depend on how the first user device 320 interfaces with the network 310. For example, if the first user device 320 is a mobile phone or tablet, the network interface 326 may comprise a transmitter/receiver with an antenna to send and receive wireless transmissions to/from the network 310. If the first user device 320 is a personal computer connected to the network 310 with a network cable, the network interface 326 may comprise a network interface card (NIC), and/or a computer port (e.g. a physical outlet to which a plug or cable connects), and/or a network socket, etc.

The second user device 330 may be a personal computer, laptop, tablet, or mobile device, etc., depending upon the implementation. The second user device 330 includes a processor 332, a memory 334, a network interface 336, and a user interface 338. The processor 332 directly performs, or instructs the second user device 330 to perform, the operations of the second user device 330 described herein, e.g. receiving an identity of an element on the webpage 309 and a distance measurement from a point (e.g. an anchor point) associated with that element, and instructing display of the cursor on a screen of the second user device 330 at a location equal to the distance measurement from the point associated with the element. The processor 332 may be implemented by one or more general purpose processors that execute instructions stored in a memory (e.g. the memory 334) or stored in another non-transitory computer readable medium. The instructions, when executed, cause the processor 332 to directly perform, or instruct the second user device 330 to perform, the operations described herein. In other embodiments, the processor 332 may be implemented using dedicated circuitry, such as, for example, a programmed FPGA, a GPU, or an ASIC. The user interface 338 includes a display 339 having a screen (which may be a touch screen). The user interface 338 may include other components also, such as a keyboard, and/or a mouse, etc., depending upon the implementation. The processor 332 implements a browser for displaying the webpage 309 on the screen of the user interface 338 of the second user device 330. The network interface 336 is for communicating over the network 310. The structure of the network interface 336 will depend on how the second user device 330 interfaces with the network 310. For example, if the second user device 330 is a mobile phone or tablet, the network interface 336 may comprise a transmitter/receiver with an antenna to send and receive wireless transmissions to/from the network 310. If the second user device 330 is a personal computer connected to the network 310 with a network cable, the network interface 336 may comprise a network interface card (NIC), and/or a computer port (e.g. a physical outlet to which a plug or cable connects), and/or a network socket, etc.

Figure 4:
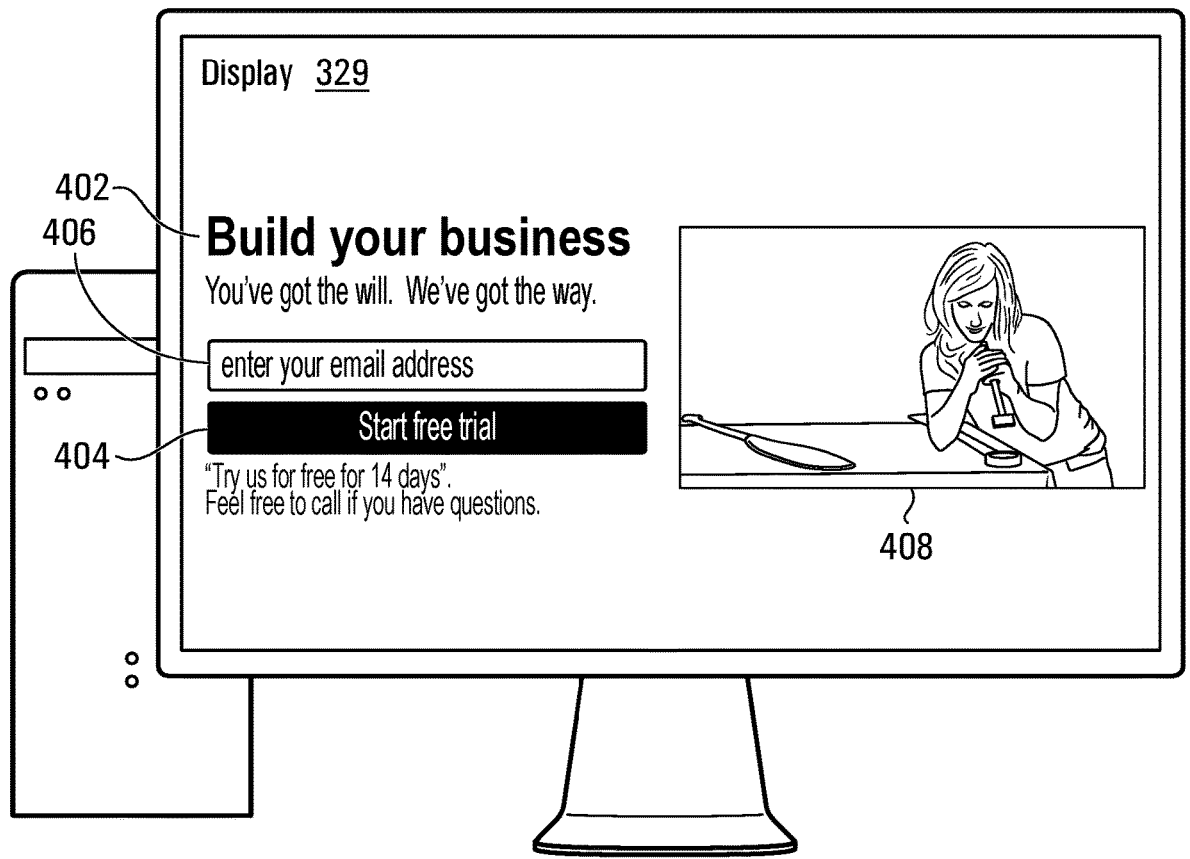
FIG. 4 illustrates an example layout of a webpage on the display of a first user device.
Figure 5:
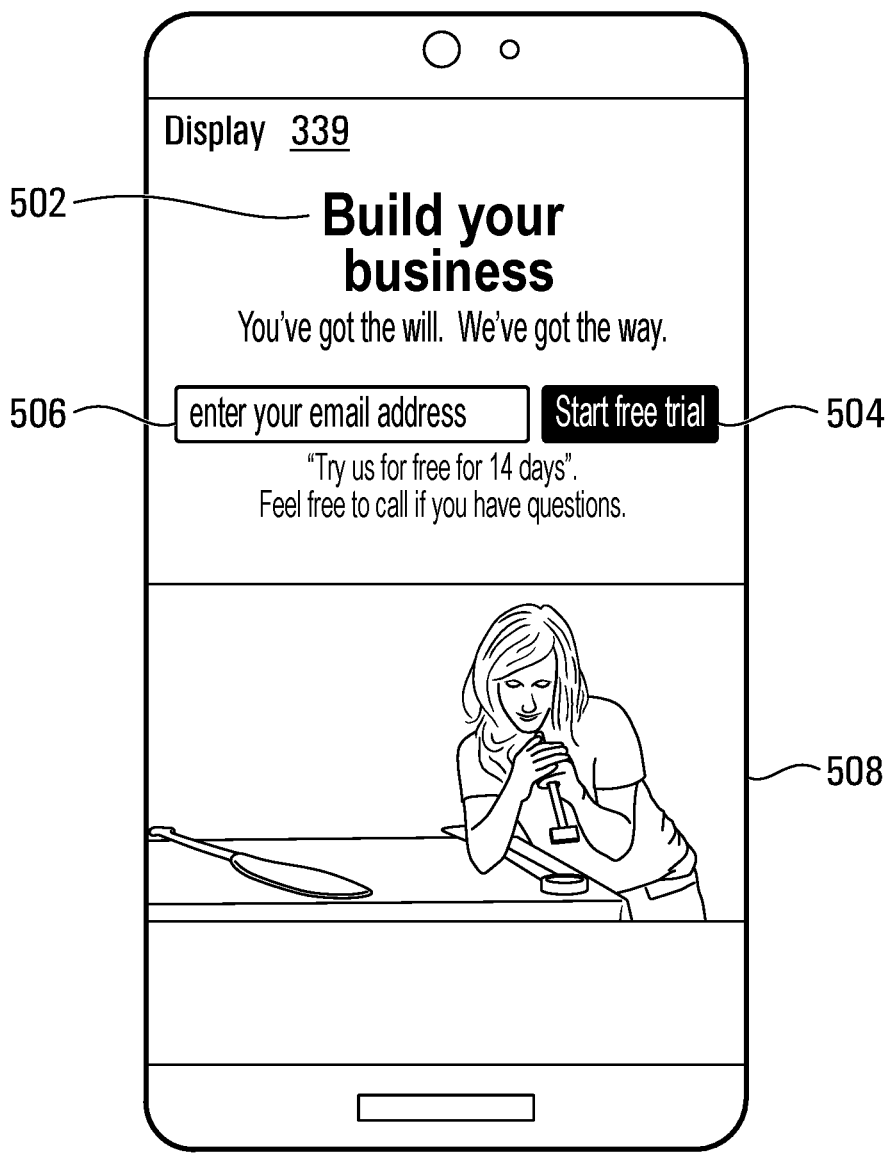
FIG. 5 illustrates an example layout of the webpage on the display of a second user device.

In operation, the web server 302 transmits the webpage 309 to the first user device 320 and the second user device 330 over the network 310. However, the layout of the webpage 309 on the screen of the first user device 320 may be different compared to layout of that same webpage 309 on the screen of the second user device 330. This is because the specific layout generated by a browser rendering a given webpage is typically dependent on factors such as the screen resolution, the screen size, and/or the web browser window size. For example, FIG. 4 illustrates an example layout of the webpage 309 on the screen of the display 329 of the first user device 320. The first user device 320 in this example is a desktop computer with a standalone display 329. The layout of the webpage 309 includes different elements displayed horizontally relative to each other. For example, the element having the text content "Build your business" 402 is displayed horizontally adjacent to the element having the image 408. On the other hand, FIG. 5 illustrates an example layout of the webpage 309 on the screen of the display 339 of the second user device 330. The second user device 330 in this example is a mobile phone. The webpage 309 has a different layout on the display 339 of the second user device 330 because of the narrow physical display size of the second user device 330. For example, the element having the text content "Build your business" 502 is displayed vertically above the element having the image 508. Therefore, if a cursor on the screen of the first user device 320 is to be displayed correctly, i.e. over the correct visual webpage element, on the screen of the second user device 330, then that cursor may need to be positioned at a completely different location on the screen of the second user device 330 compared to on the screen of the first user device 320. The location on the screen may be measured relative to a coordinate system, e.g. a coordinate system having an origin at the top-left corner of the screen.

Embodiments are disclosed below for displaying a cursor associated with the first user device 320 on the screen of the second user device 330, even when the webpage 309 has a different layout of the screen of the second user device 330 compared to the layout of the webpage 309 on the screen of the first user device 320. In the explanation below, the "first user" refers to the user of the first user device 320, and the "second user" refers to the user of the second user device 330.

The webpage 309 comprises one or more elements, each of which may be referred to as a webpage element. An HTML element is an example of a webpage element. Each of the following is an example of an element (e.g. an HTML element) that may be on a webpage: a text header, a paragraph, a link, an image, and/or a divider. The preceding list is non-exhaustive. Other webpage elements may be possible, e.g. possibly defined in XML. In some embodiments, a webpage element is tagged with a unique identifier (ID) that identifies the element. In some embodiments, a webpage element is a node (or tree of nodes) in a Document Object Model (DOM). A DOM is a tree-like structure that may be used to represent the content of the webpage 309 and the structure of that content. In some embodiments, the webpage 309 may be defined by its DOM, and the same DOM may be rendered in every browser that loads that webpage 309. Each node in the DOM has attributes, some of which may be shared, and others of which may be unique, e.g. the identification (ID) attribute may be unique. When transmitting the webpage 309 to different user devices (e.g. to the first user device 320 and the second user device 330), the same set of elements/nodes may be transmitted from the web server 302 to each user device, but that same set of elements/nodes may be given a different layout on each user device during rendering, e.g. based on the screen resolution, the screen size, and/or the web browser window size.

In some embodiments, one or more elements of the webpage 309 that each satisfy the following properties are used in the manner described below as part of the cursor sharing implementation: (i) the element is uniquely identifiable from all other elements on the webpage 309, and (ii) the element is always present in all layouts of the webpage 309. A non-exhaustive list of elements satisfying this property may include:

An element that has or is associated with an identifier that is unique among the identifiers of all other elements on the webpage 309, e.g. an element having a unique id attribute or a unique source ("src") attribute.

An element having text content that is unique on the webpage 309, e.g. a particular text header, such as the text header having the unique header text "Build your business" shown at 402 of FIG. 4 and 502 of FIG. 5.

An element that includes a hyperlink that is unique from other hyperlinks. For example, elements 404 and 504 shown as a button "Start free trial" in FIGS. 4 and 5 respectively are associated with a unique hyperlink (that links to a "free trial" sign-up webpage).

An element that comprises a field in which text can be entered, and the field is uniquely identifiable from other fields on the webpage 309. For example, elements 406 and 506 in FIGS. 4 and 5 respectively indicate a field for entering an email address. The field is uniquely identifiable from other fields on the webpage 309.

An element that is an image that is uniquely identifiable from other images on the webpage 309, e.g. the hash or ID of the image is different from the hash or ID of any other images on the webpage 309. For example, elements 408 and 508 in FIGS. 4 and 5 respectively indicate an image that is uniquely identifiable from other images on the webpage 309.

Each selected element may be associated with a respective point, which will be referred to as an "anchor point". The anchor point is predefined to be at a particular location within or in proximity to the element, e.g. the top left corner of the element. The location of each anchor point may be defined as a particular coordinate (or relative coordinate) in a coordinate space. The location of each anchor point may be communicated to a user device along with the webpage 309 itself (e.g. included as part of the webpage 309). Each anchor point defines an origin of a pixel coordinate space of a region that is associated with the anchor point and that includes the anchor point as its origin. The webpage 309 thus includes a plurality of regions, each having its own respective anchor point.

For each of the first user device 320 and the second user device 330, the respective browser displays the webpage 309 according to the particular layout generated by the browser, and so the browser knows the pixel coordinate of each anchor point for its device. The browser also knows the pixel coordinate of the cursor for its device. A "pixel coordinate" represents any coordinate unit that maps to a display, e.g. a pixel coordinate may be or include a pixel, a subpixel, a plurality of pixels, a plurality of subpixels, or a point, depending upon how the display is implemented. In some embodiments, a pixel coordinate may be interchangeably called a pixel, depending upon the implementation.

Figure 6:
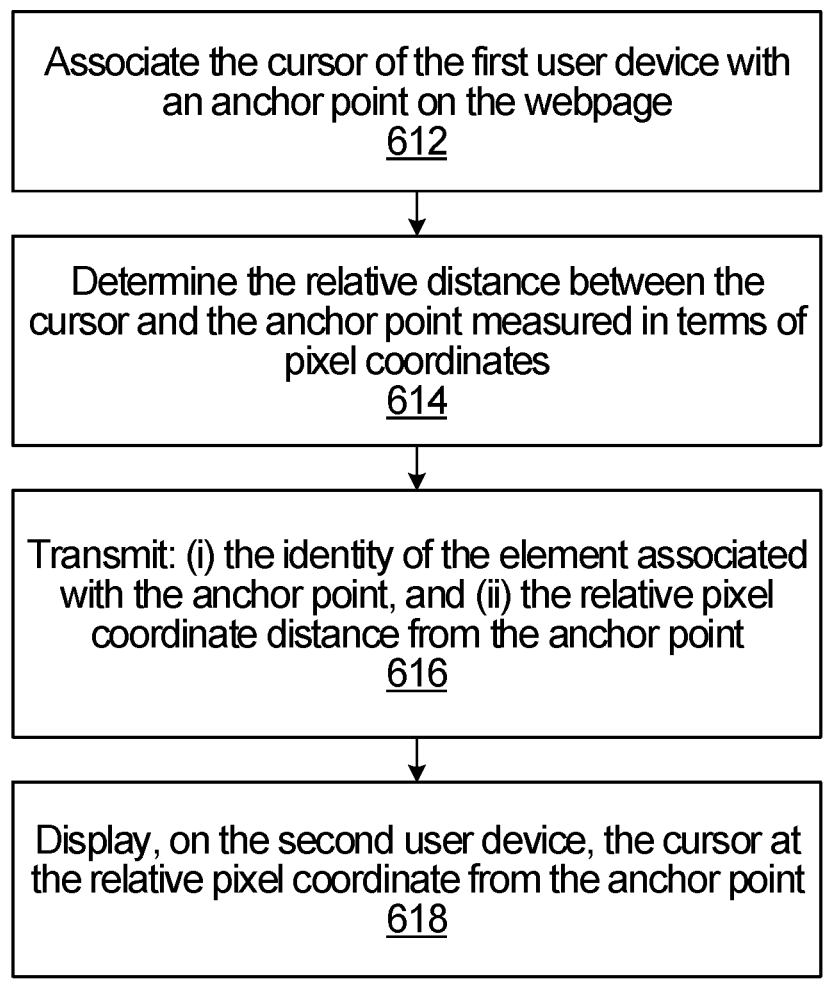
FIG. 6 illustrates a block diagram of a method of displaying a cursor of a first user device on a second user device according to one embodiment.

When the cursor sharing is to be performed, the method of FIG. 6 may be implemented. FIG. 6 is a block diagram of a method for displaying the cursor of the first user device 320 on the screen of the second user device 330, according to one embodiment.

At step 612, the cursor on the screen of the first user device 320 is associated with a particular anchor point on the webpage 309 displayed on the screen of the first user device 320. The cursor may be associated with a particular anchor point in different ways.

Figure 7:
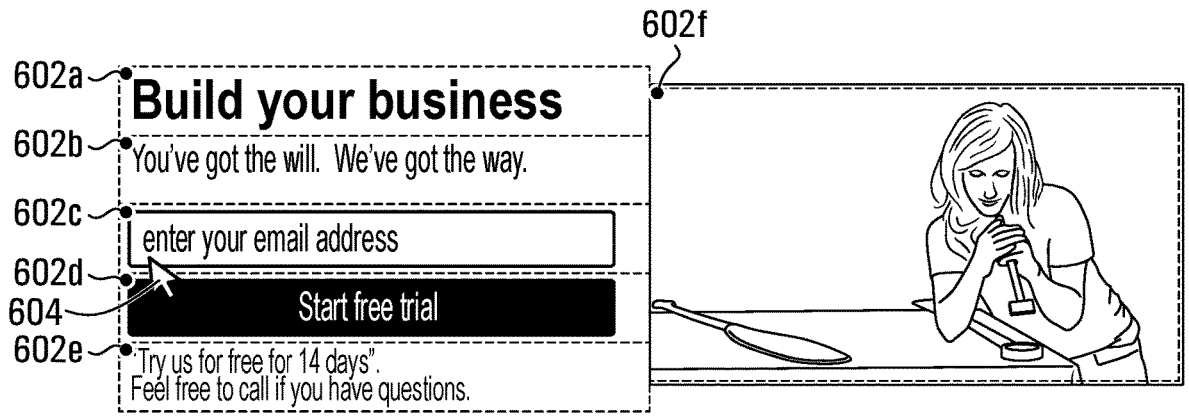
FIGS. 7 and 8 illustrate associating a cursor with anchor points of the webpage displayed on the first user device, according to various embodiments.

For example, in some embodiments, and as shown in FIG. 7, the webpage 309 may include a plurality of regions. Each region is an area defined by a stippled line box in FIG. 7. Each region encompasses a respective area of pixel coordinates displayed on the screen of the first user device 320. Each region is associated with a respective different element that has an associated anchor point also in that region. The cursor is associated with the anchor point corresponding to the region in which the cursor is located. For example, six anchor points 602a-602f are defined in FIG. 7, each one at the top left corner of a unique element of the webpage 309 that is displayed on the screen of the first user device 320. In some embodiments, each region is defined by only using the positive coordinate space of each anchor point (with the anchor point as the origin), and further bounding the positive coordinate space by the start of the next anchor point. In some embodiments, negative coordinates (relative to an anchor point) might only be allowed if there exists no other anchor point in the negative coordinate directions. For example, negative coordinate values associated with anchor points 602a-602e may be defined because there are no other anchor points to the left of anchor points 602a-602e. In contrast, negative coordinate values might not be associated with anchor point 602f because there are other anchor points 602a-602e to the left of the element associated anchor point 602f. This is implementation specific, and in other embodiments each region may include negative and positive coordinate values, e.g. if the anchor point is in the middle of the region. The cursor is associated with the anchor point corresponding to the region in which the cursor is located. For example, in FIG. 7 the cursor 604 is associated with the anchor point 602c.

The example in FIG. 7 explicitly illustrates and defines different regions, but in actual implementation there may not be regions explicitly defined per se. For example, in some embodiments the cursor may be associated with an anchor point by finding an anchor point that has an (x,y) pixel coordinate value that is less than the (x,y) pixel coordinate value of the cursor.

Figure 8:
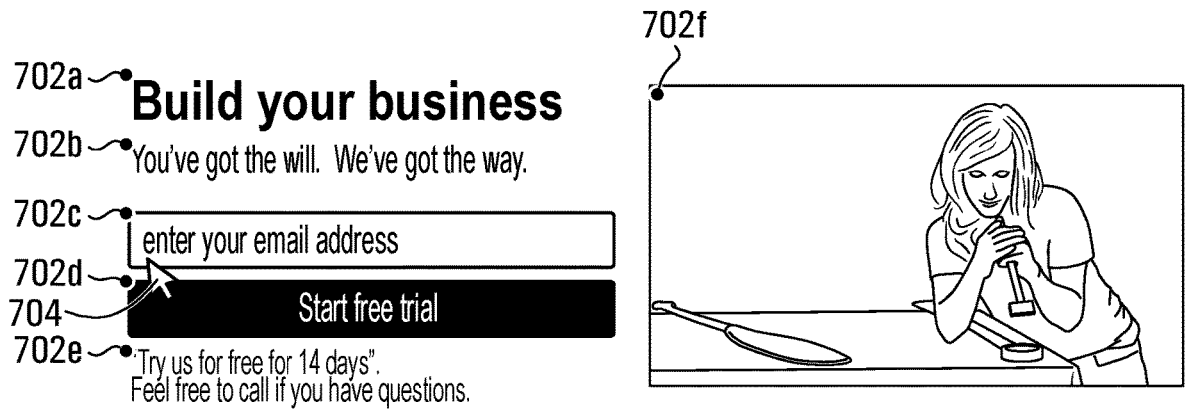

In another example shown in FIG. 8, the cursor is associated with the anchor point to which the cursor is closest. Separately partitioned (non-overlapping) regions are not defined. Each anchor point defines the origin of its own region, which may encompass the whole displayed area. As shown in FIG. 8, six anchor points 702a-702f are defined, each one at the top left corner of a unique element on the webpage 309 displayed on the screen of the first user device 320. The cursor 704 is associated with the anchor point 702d because the cursor 704 is closest to the anchor point 702d.

Returning to FIG. 6, at step 614, a relative distance between the cursor and the anchor point, measured in terms of (x, y) pixel coordinates, is determined by the browser of the first user device 320. This is possible because the browser generates the display of the webpage 309 on the screen of the first user device 320. As a result, the browser knows the pixel coordinate of the associated anchor point, and the browser also either directly knows or can obtain the pixel coordinate of the cursor. For example, the position of the cursor relative to the viewport, i.e. the area inside the browser where a webpage is partially or completely presented, may be provided from the operating system to the browser or obtained by the browser by making a call to an application programming interface (API).

Figure 9:
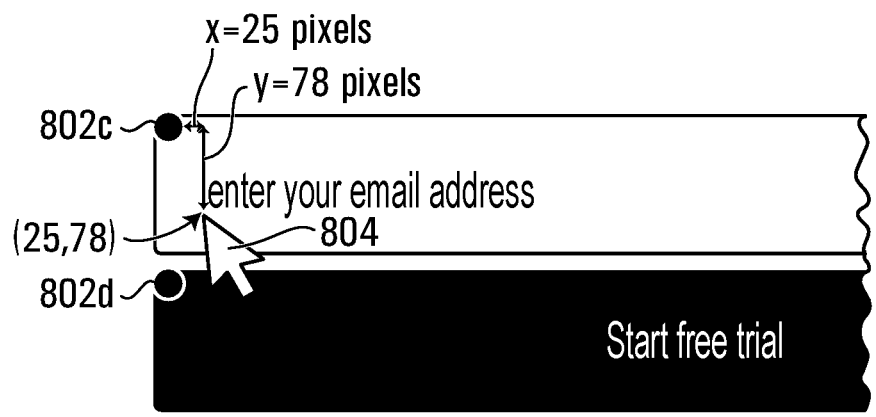

FIG. 9 illustrates measurement of relative distance between a cursor and an anchor point in terms of (x, y) pixel coordinates as determined by the browser of the first user device 320, according to one embodiment. The cursor 804 is associated with the anchor point 802c, i.e. the anchor point associated with the webpage element that is the field for entering an email address. The cursor is not associated with anchor point 802d as the cursor 804 is not in the region associated with anchor point 802d. The cursor 804 is 25 pixel coordinates horizontally right and 78 pixel coordinates vertically down, relative to anchor point 802c as the origin. The relative pixel coordinate of the cursor is therefore (25, 78).

Returning to FIG. 6, at step 616, the identity of the element corresponding to the associated anchor point, along with the relative pixel coordinate of the cursor, are then transmitted to the second user device 330. In the example of FIG. 9, the following is transmitted: an identity of the element associated with anchor point 802c and the relative pixel coordinate (25, 78). What is used as the identity of the element may be implementation specific. For example, the identity may be a unique identifier (ID) associated with the element, or the identity may be some other unique way of identifying the element. For example, in the example of FIG. 9 the text associated with the element ("Enter your email address") may be used to uniquely identify the element from other elements on the webpage 309. In some embodiments, an identity of the anchor point may act as the identity of the element associated with that anchor point. In some embodiments, the transmission from the first user device 320 to the second user device 330 is via the web server 302. For example, the first user device 320 transmits the identity of the element associated with the anchor point 802c and the relative pixel coordinate (25, 78) to the web server 302, and then the web server 302 transmits this to the second user device 330 along with an instruction to display the cursor at the relative pixel coordinate from the same anchor point on the second user device 330. Note that the instruction to display the cursor at the relative pixel coordinate might not be an explicit instruction, but instead might be an implicit or inherent instruction. For example, the act of receiving the identity of the element associated with the anchor point 802c and the relative pixel coordinate (25, 78), by the second user device 330, may itself act as the instruction to display the cursor at that relative pixel coordinate on the second user device 330. In other embodiments, the first user device 320 may directly transmit to the second user device 330 over the network 310.

Figure 10:
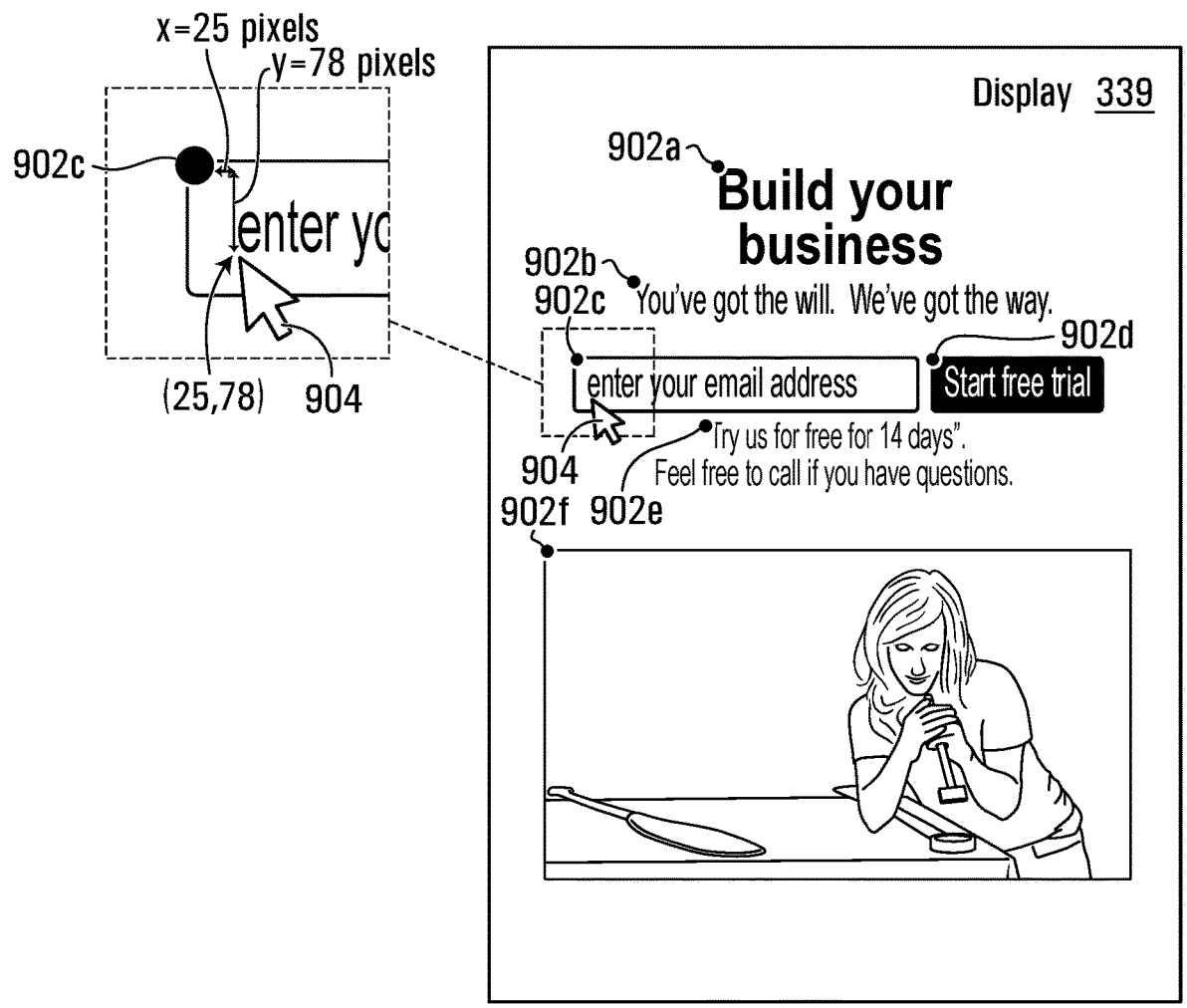

At step 618, the second user device 330 receives the identity of the element associated with the anchor point and the relative pixel coordinate from that anchor point sent by the first user device 320. The browser of the second user device 330 displays the webpage 309 according to the particular layout generated by its browser. As a result, the browser of the second user device 330 knows the pixel coordinate of each anchor point for the webpage 309 as displayed on the second user device 330. The second user device 330 therefore obtains the pixel coordinate of the anchor point associated with the element identified by the first user device 320, and displays the cursor at the identified relative pixel coordinate from that anchor point. For example, FIG. 10 illustrates the webpage 309 as displayed on the screen of the second user device 330, including the location of each of the six anchor points 902a-902f The cursor 904 of the first user device 320 is displayed in the region of the element associated with anchor point 902c because this corresponds to the identity of the element received from the first user device 320. The cursor 904 of the first user device 320 is displayed 25 pixel coordinates horizontally right and 78 pixel coordinates vertically down relative to anchor point 902c as the origin. This corresponds with the received relative pixel coordinate from the first user device 320, i.e. (25, 78) from anchor point 802c.

Some Variations of the Method of FIG. 6

In some embodiments, instead of (or in addition to) the first user device 320 sending the distance measurement from the anchor point as a relative pixel coordinate, the first user device 320 may send the distance measurement in terms of a fraction (e.g. percentage) of the width and/or length of the browser window. Sending a measurement in terms of fraction of the browser window may work well when different devices have significantly different screen resolutions, but the element associated with the anchor point scales proportionally across the different layouts. For example, FIG. 11 illustrates the screen on the display 329 of the first user device 320 (in the top half of FIG. 11), as well as the screen on the display 339 of the second user device 330 (in the bottom half of FIG. 11). The cursor 1014 on the screen of the second user device 330 is displayed over the same item in the image as the cursor 1004 on the screen of the first user device 320. In the example of FIG. 11, the identity of the image element associated with the anchor point 1002f is sent to the second user device 330, along with the distance measurement from the anchor point 1002f in terms of percentage of the horizontal length of the browser window. In the example of FIG. 11, the cursor 1004 is at a point corresponding to 65 percent of the horizontal width of the browser window relative to anchor point 1002f as the origin. The relative distance measurement transmitted may therefore include 65% of the horizontal width of the browser. The second user device 330 obtains the pixel coordinate of the corresponding anchor point 1012f and displays the cursor at a distance from that anchor point measured in terms of 65% of the horizontal length of its browser window. The vertical distance from the anchor point may also be transmitted in terms of percentage of browser window in the vertical direction, assuming the webpage layouts on the different screens show the same amount of vertical content. Otherwise, the measurement from the anchor point may be a percentage of the browser window in the horizontal direction and a measurement of pixel coordinates in the vertical direction, e.g. "(0.65, 78)" may be transmitted to indicate that the cursor is to be at the horizontal point corresponding with 65 percent of the browser window and 78 pixel coordinates vertically down from that point.

In some embodiments, instead of sending a distance measurement in terms of fraction (e.g. percentage) of browser window, the distance measurement may be in terms of fraction (e.g. percentage) of width and/or length of the element. This may work well for elements, such as images, that scale proportionally across different layouts, particularly if the different devices have different screen resolutions. For example, FIG. 12 illustrates the screen on the display 329 of the first user device 320 (in the top half of FIG. 12), as well as the screen on the display 339 of the second user device 330 (in the bottom half of FIG. 12). The cursor 1114 on the screen of the second user device 330 is displayed over the same item in the image as the cursor 1104 on the screen of the first user device 320. The identity of the image element associated with anchor point 1102f is sent to the second user device 330, along with a distance measurement from the anchor point 1102f in terms of percentage of the horizontal width and vertical length of the element. In the example of FIG. 12, the cursor 1104 is at a point corresponding to 77 percent of the horizontal width of the image element and 45 percent of the vertical length of the image element, relative to anchor point 1102f as the origin. The horizontal width (77%) and vertical length (45%) are transmitted from the first user device 320 to the second user device 330. The second user device 330 obtains the pixel coordinate of the anchor point 1112f, which is associated with the image element as displayed on its browser, and displays the cursor at a distance from that anchor point 1112f measured in terms of the received percentage of the horizontal width (77%) and vertical length (45%) of the element as displayed on its browser. The width and height of a webpage element may be predefined or determined by the browser, e.g. through an API call.

In the examples in FIGS. 11 and 12, the identity of an image element is transmitted from the first user device 320 to the second user device 330. The identity may be a unique ID associated with the image element, which may be assigned to the image element or possibly even derived from the image (e.g. a hash of the image). In some embodiments, each image may be associated with a source tag ("src" tag), e.g. a URL that points to where the image resides on a server, and this source tag may be used as the ID of the image. If a hash of the image is used as the ID of the image element, then in some embodiments the hash may be computed on the source image (not a resized version shown in the browser), or the hash may use a hash algorithm that can work for "similar" images. One example of a hash algorithm is the perceptual hash ("pHash") algorithm.

In some embodiments, for one, some, or all of the anchor points, the measurement may also or instead be in terms of fraction (e.g. percentage) of width and/or length to an adjacent anchor point. For example, returning to FIG. 7, the vertical distance of the cursor 604 from anchor point 602c may be measured from anchor point 602c in terms of percentage to vertically adjacent anchor point 602d.

Figure 13:
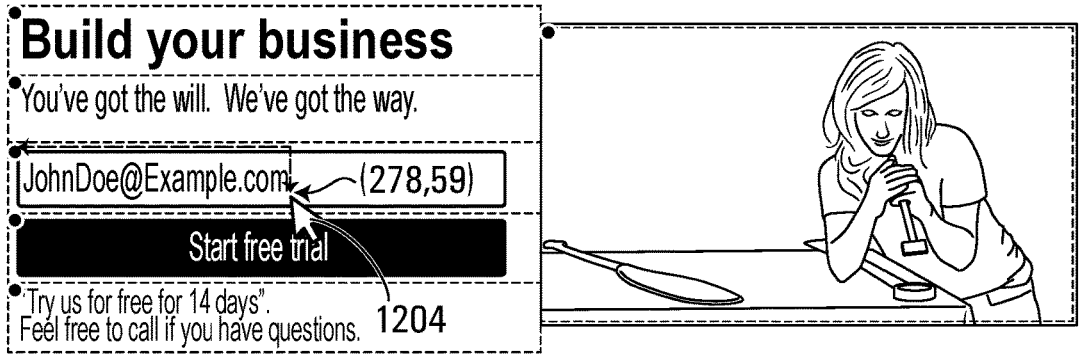
Figure 14:
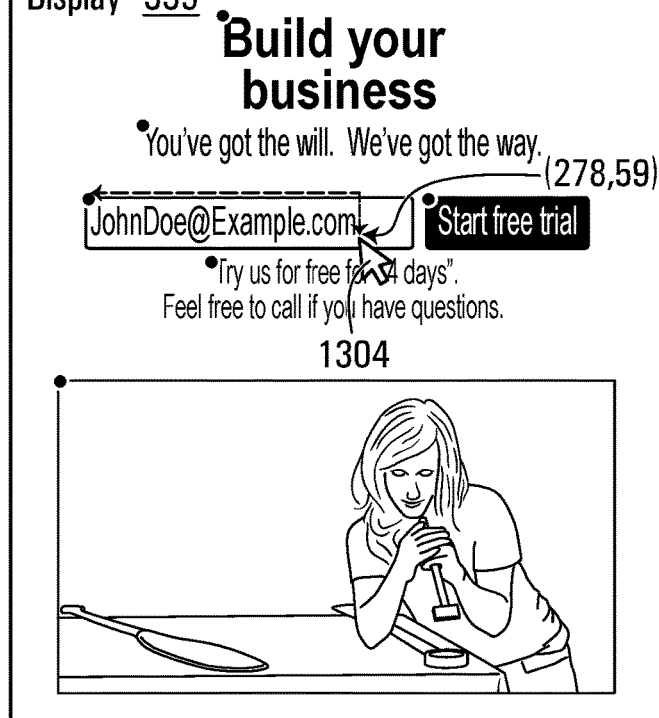

There are different situations in which it may be more accurate to transmit the distance from the anchor point in terms of pixel coordinates rather than in terms of fraction (e.g. percentage) measurements, or vice versa. For example, if the size of particular content, e.g. text entered by a user in a field, is the same or substantially the same across different layouts, then transmitting the distance from the anchor point in terms of pixel coordinates may produce a more accurate result. For example, FIG. 13 illustrates content of the webpage 309 as presented on the screen of the display 329 of the first user device 320, and FIG. 14 illustrates the same content of the webpage 309 as presented on the screen of the display 339 of the second user device 330. Despite the different layouts in FIGS. 13 and 14, the text "JohnDoe@Example.com" is displayed as the same size in both layouts of FIGS. 13 and 14. Because the text size of "JohnDoe@Example.com" does not change between the layouts, a better result may be produced if the distance measurement from the anchor point is in (x, y) pixel coordinates, e.g. (278,59). If the distance measurement was instead in terms of percentage of the browser window or percentage of the element, then cursor 1204 displayed immediately adjacent to the right of the text ".com" on the screen of the first user device 320 in FIG. 13 would generally not translate to displaying cursor 1304 immediately adjacent to the right of the text ".com" on the screen of the second user device 330 in FIG. 14.

In some embodiments, whether the distance measurement from an anchor point is in terms of pixel coordinates or fraction (e.g. percentage) may vary on an anchor point by anchor point basis on the webpage depending upon the element that anchor point is associated with and how the properties of the element change when the layout, screen size, and/or resolution changes between devices.

Other Variations and Additions

Figure 15:
FIGS. 15 to 20 illustrate visual effects related to the display of the cursor, according to various embodiments.

In some embodiments, if the location of the cursor on the screen of the first user device 320 is associated with an element that is not presently displayed on the screen of the second user device 330 (e.g. because the webpage 309 has a different layout on the screen of the second user device 330 or the second user is viewing a different part of the webpage 309), then the browser of the second user device 330 may automatically scroll the displayed portion of the webpage 309 up or down and/or left or right as needed to display the cursor of the first user device 320 on the screen of the second user device 330. For example, a browser window displaying the webpage 309 on the screen of the second user device 330 may be scrolled so that the visible portion of the webpage 309 includes the cursor of the first user device 320. In a more particular example, the display of the webpage 309 may be centered (vertically and/or horizontally) on the cursor of the first user device 320 (e.g., so that the cursor of the first user device 320 falls at or about the centre of the displayed portion of the webpage 309. The automatic scrolling may occur slowly/gently to reduce surprise and aggregation of the second user. In other embodiments, instead of automatic scrolling of the displayed portion of the webpage 309, a message may be displayed on the screen of the second user device 330 indicating that the first user's cursor is off screen in a particular direction. The message may act as a prompt for the second user to manually scroll in the direction indicated. Alternatively, clicking on the message could automatically scroll the displayed portion to the first user's cursor (e.g., so that the first user's cursor is then centered vertically and/or horizontally in the displayed portion of the webpage 309). For example, FIG. 15 illustrates the webpage 309 as displayed on the screen of the display 339 of the second user device 330. A message box 1404 indicates that the cursor of the first user (referred to as "Jane" in FIG. 15) is off screen. Message box 1404 further indicates the direction in which the first user's cursor is located, prompting the second user to manually scroll in that direction to see the first user's cursor. Alternatively, the second user may click on message box 1404, upon which the displayed portion of the webpage 309 would automatically scroll to the location of the first user's cursor.

Figure 16:
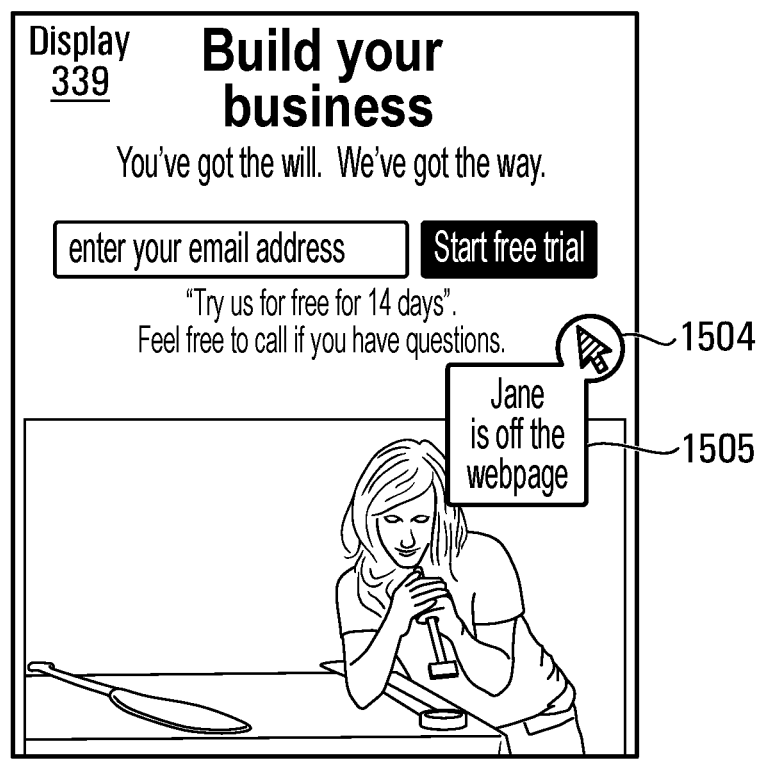

In some embodiments, if the cursor of the first user device 320 is no longer on the webpage 309, e.g. the first user has moved their cursor out of their browser window, then the first user's cursor might no longer display on the second user device 330. Alternatively, the last location of the first user's cursor on the webpage 309 may remain on the screen of the second user device 330, but with the cursor modified in appearance (e.g. greyed out) to indicate to the second user that the first user's cursor has moved off of the webpage 309 on the first user device 320. A message to the second user may be displayed in addition to (or instead of) the modified cursor. For example, FIG. 16 illustrates the webpage 309 as displayed on the screen of the display 339 of the second user device 330. A message box 1505 is displayed on the screen of the second user device 330, alongside cursor 1504 which is greyed out, indicating that the cursor of the first user (referred to as "Jane" in FIG. 16) is no longer on the webpage 309 on the first user device 320. The first user's cursor may also or instead be modified (e.g. greyed out) when the first user is performing an action resulting in a change in the display of the first user device 320 that is not seen on the second user device 330, e.g. the first user clicks on an element on the webpage 309 that causes a modal window to display on only the first user device 320.

In some embodiments, the state of one, some, or all of the elements of the webpage 309 may be synchronized between users. For example, if the first user enters text in a field or selects an element that displays a menu, the same action may be displayed on the second user device 330, e.g. by having the web server 302 push the state of the element(s) to the browser of the second user device 330.

Figure 17:
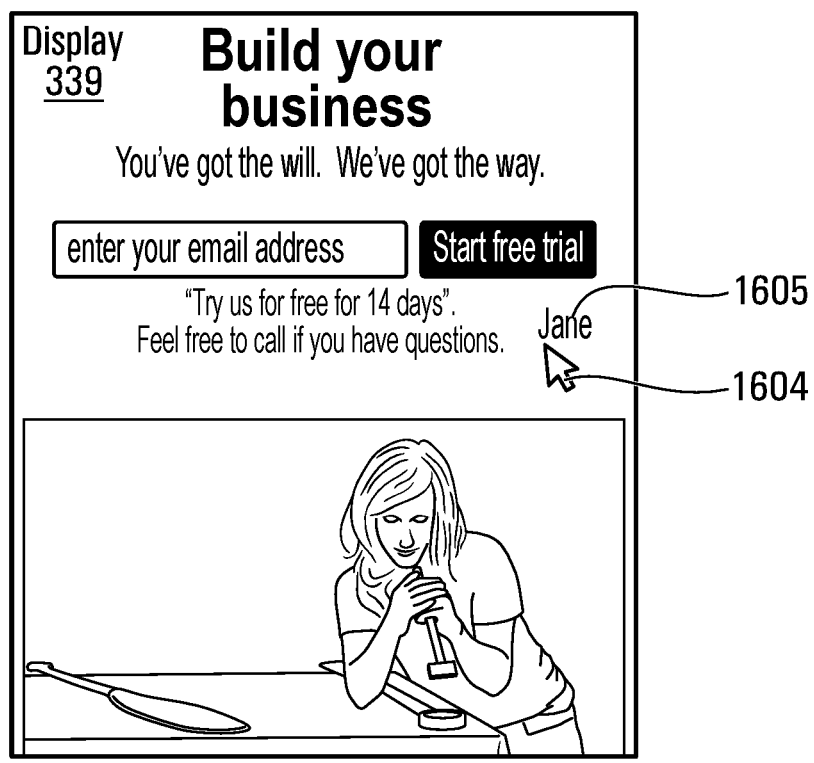

In some embodiments, when a cursor position is transmitted to another device, a user ID associated with the cursor is also transmitted for display in association with the cursor, so that the person viewing the device knows the user associated with the cursor. For example, FIG. 17 illustrates the webpage 309 as displayed on the screen of the display 339 of the second user device 330. A user ID associated with the first user (shown as the word "Jane" 1605) is displayed on the screen of the second user device 330 alongside the first user's cursor 1604.

Figure 18:

In some embodiments, when the first user is selecting something using their cursor (e.g. by pressing down the mouse button), then that information (e.g., information identifying the location (and/or extent) of the selection and/or of the selected element) is also transmitted to the second user device 330, and the cursor is visually modified on the screen of the second user device 330 to show that the cursor is selecting something. For example, FIG. 18 illustrates the webpage 309 as displayed on the screen of the display 339 of the second user device 330. The first user's cursor 1704 is visually modified to be encircled on the screen of the second user device 330. The encirclement of cursor 1704 indicates that the first user is selecting the "Start free trial" element on the first user device 320.

In some embodiments, the last time the cursor of the first user device 320 was moved by the first user is tracked/monitored. If the cursor is idle for a particular period of time, then the cursor may be removed from the screen of the second user device 330. The second user device 330 may locally track the last time the first user device's cursor was moved and decide locally to remove the first user's cursor from the screen of the second user device 330 if the first user's cursor is idle for a predetermined amount of time. Alternatively, the web server 309 may monitor this information and instruct the second user device 330 to remove the first user's cursor from the display 339 of the second user device 330.

In some embodiments, the second user device 330 generates a visual effect with the first user's cursor, e.g. causes the first user's cursor to have localized motion around the position of the first user's cursor (such as causing the first user's cursor to slightly tremble/jitter on the screen). The visual effect may instill a feeling in the second user that the first user's attention is on the webpage 309 and that the first user is actively participating in the session. More generally, the visual effect indicates, to the second user, that the first user is interacting with the first user device 320. Additionally or alternatively, such a visual effect may assist the second user in easily locating the first user's cursor within the displayed of the webpage 309 and/or may assist in drawing and/or maintaining the attention of the second user to/on the first user's cursor. The visual effect may always be implemented or just implemented when the first user's cursor is stationary.

In some embodiments, the first user is sometimes or always able to drag the cursor on the screen of the first user device 320 to select (e.g. highlight) a particular area of the webpage 309, and the same area is highlighted on the screen of the second user device 330 by transmitting to the second user device 330: (i) an indication that an area is being highlighted (e.g. based on the first user pressing the mouse button and dragging the mouse); (ii) an indication of a first corner of the area; and (iii) an indication of a diagonally opposite second corner of the area. In some embodiments, the first user device 320 selects the first corner of the area as the coordinate of the first user's cursor when the first user initially presses down their mouse cursor. That location is sent to the second user device 330 in one of the manners described above, e.g. by sending the identity of the element of the associated anchor point and a relative distance from that anchor point. The first user device 320 selects the diagonally opposite second corner of the area as the coordinate of the first user's cursor when the first user ceases pressing down their mouse cursor. That location is also sent to the second user device 330 in one of the manners described above, e.g. by sending the identity of the element of the associated anchor point and a relative distance from that anchor point. In this way, the extents of the selected area may be communicated by the first user device 320 to the second user device 330. The second user device 330 indicates a corresponding area on the second user's screen using the received diagonal coordinates.

Figure 19:
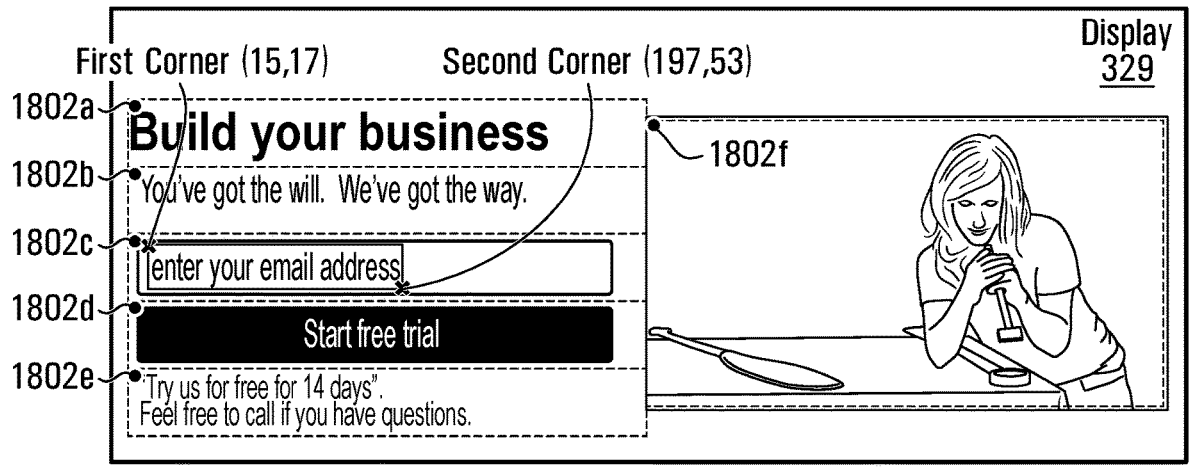
Figure 20:
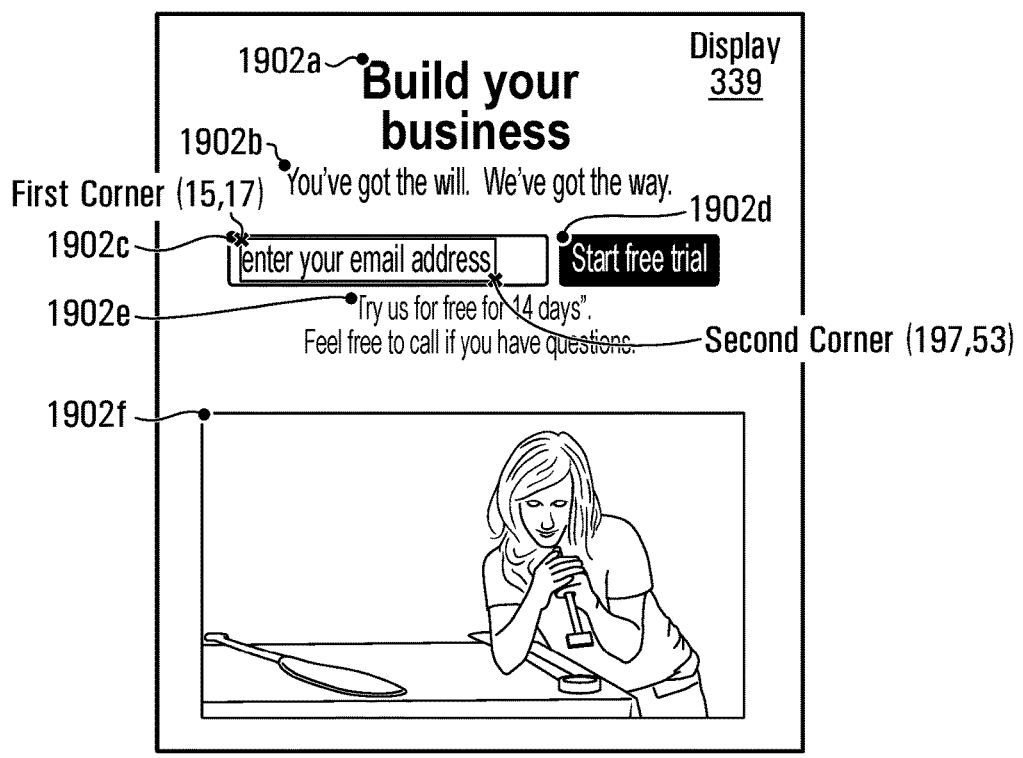

For example, FIG. 19 illustrates content of the webpage 309 as presented on the screen of the display 329 of the first user device 320. Each element has an associated anchor point. Six anchor points 1802a-f are illustrated. Each one of the anchor points is the origin of a corresponding region. A region is indicated using a stippled line box. The first user has highlighted an area encompassing the text "enter your email address". The highlighted area is in the region corresponding to the element for entering an email address. The element has associated anchor point 1802c. The relative pixel coordinates of the diagonally opposite corners of the highlighted area, measured from anchor point 1802c, are transmitted to the second user device 330. In this way, the extents of the rectangular highlighted area may be identified to the second user device 330. In the example in FIG. 19, these relative pixel coordinates are (15, 17) for the top left corner of the highlighted area and (197, 53) for the bottom right corner of the highlighted area. The identity of the element associated with each of the relative pixel coordinates (which happens to be the same element in the example in FIG. 19) is also transmitted to the second user device 330. FIG. 20 illustrates the webpage 309 as presented on the screen of the display 339 of the second user device 330. The elements on the second user device 330 are also each associated with their respective anchor point. Six anchor points 1902a-e are illustrated. A visual effect is presented on the screen of the second user device 330 in the form of a highlighted area corresponding to the same area highlighted on the first user device 320. The relative pixel coordinates of the diagonally opposite corners received from the first user device 320, as well as the associated element received from the first user device 320, are used to generate the highlighted area on the screen of the second user device 330. The anchor point 1902c is used as the origin for the received relative pixel coordinates because anchor point 1902c corresponds to the same element as anchor point 1802c of FIG. 19.

In the example illustrated in FIGS. 19 and 20, the top left and bottom right diagonally opposite corners of the highlighted area are each associated with the same element (the field for entering the email address), and hence the distance measurement for each diagonally opposite corner is from the same anchor point 1802c. Depending upon the size and/or location of the area highlighted by the first user, the distance measurement for each diagonally opposite corner may be associated with different elements. In this case, the second user device 330 receives an indication of which element each distance measurement is associated with.

Methods

Figure 21:
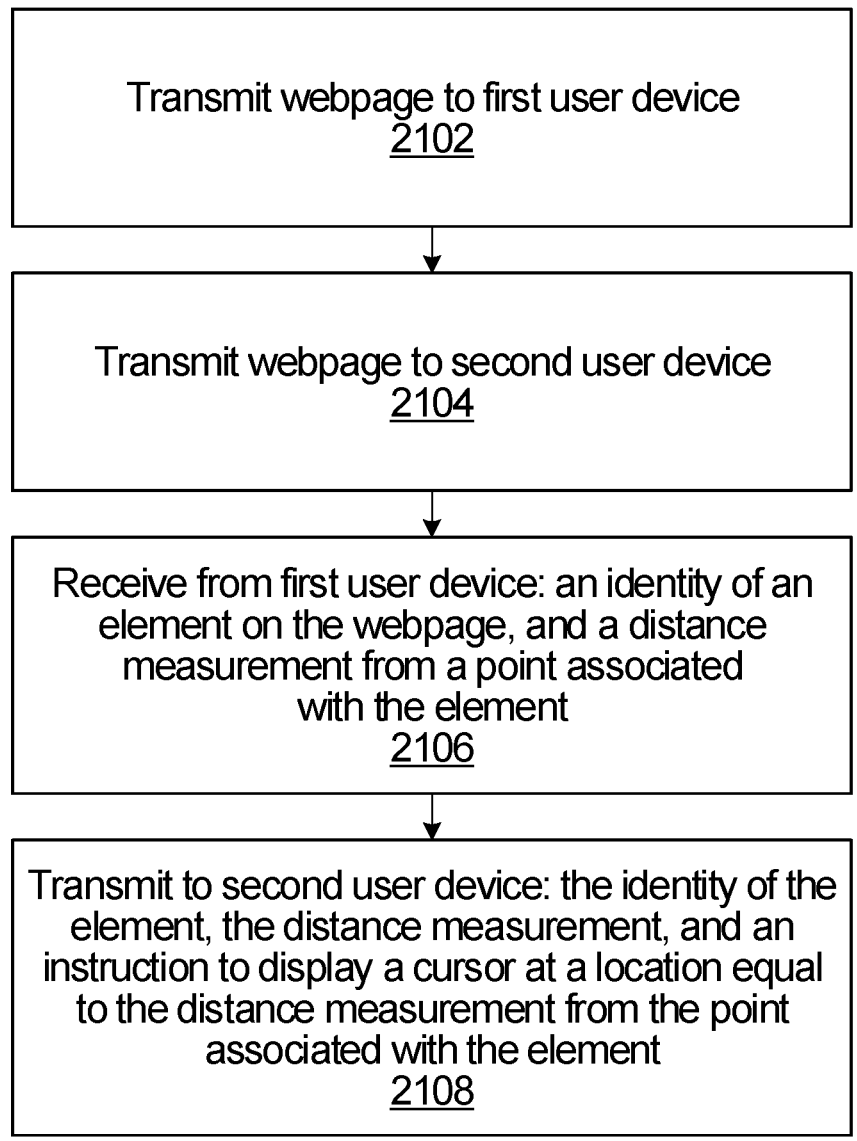
FIG. 21 illustrates a block diagram of a method performed by a server, according to one embodiment.

FIG. 21 is a block diagram of a method performed by a server, according to one embodiment. The method of FIG. 21 will be described as being performed by the web server 302 of FIG. 3, although more generally this need not be the case. For example, the method may be performed by another server that is not web server 302, or by another computing device (not necessarily a server), which might or might not be distributed.

At step 2102, the web server 302 transmits the webpage 309 to the first user device 320 for display on a screen associated with the first user device 320 (e.g. for display on the display 329).

At step 2104, the web server 302 transmits the webpage 309 to the second user device 330 for display on a screen associated with the second user device 330 (e.g. for display on the display 339).

At step 2106, the web server 302 receives from the first user device 320: an identity of an element on the webpage 309, and a distance measurement from a point associated with the element. For example, the point may be an anchor point, as described earlier. Examples of types of distance measurements described earlier include relative pixel coordinates (e.g. akin to those described in relation to FIGS. 9 and 10) or distance measurement in terms of fraction, such as in terms of percentage (e.g. akin to those described in relation to FIGS. 11 to 12).

At step 2108, the web server 302 transmits to the second user device 330: the identity of the element, the distance measurement, and an instruction to display a cursor on the screen associated with the second user device 330 at a location equal to the distance measurement from the point associated with the element. In some embodiments, the instruction may be explicit. In some embodiments, the instruction may be implicit or inherent, e.g. the second user device 330 may be instructed by way of receipt of the identity of the element and the distance measurement at the second user device 330.

In some embodiments, the webpage 309 transmitted to the first user device 320 and the second user device 330 includes an indication of a location of the point. In some embodiments, the indication of the location of the point may be transmitted separately from the webpage 309. In some embodiments, the indication of the location of the point may be in relation to the element when the element is displayed. In one example, the point is an anchor point, and the webpage 309 includes an indication of the pixel coordinate of each anchor point. The pixel coordinate may be an absolute pixel coordinate value or a relative pixel coordinate value (e.g. relative to a particular origin of a coordinate space).

In some embodiments, the distance measurement includes a first value indicative of a distance from the point in a first direction and a second value indicative of a distance from the point in a second direction. The second direction may be perpendicular to the first direction. Such is the case in all of the examples described earlier in relation to FIGS. 9 to 12. For example, the first value may be the number of pixels or pixel coordinates from the point in a horizontal direction, and the second value may be the number of pixels or pixel coordinates from the point in a vertical direction. As another example, the point is a first point, the element is a first element, and the first value may be a measurement of horizontal distance from the first point in terms of fraction (e.g. percentage) of horizontal length of a browser window or fraction (e.g. percentage) of horizontal length of the first element or fraction (e.g. percentage) of horizontal length between the first point and a second point associated with a second element on the webpage 309; and/or the second value may be a measurement of vertical distance from the first point in terms of fraction (e.g. percentage) of vertical length of a browser window or fraction (e.g. percentage) of vertical length of the first element or fraction (e.g. percentage) of vertical length between the first point and a third point associated with a third element on the webpage 309. The second point and the third point may be the same point in some embodiments.

In some embodiments, the identity of the element uniquely identifies the element from all other elements on the webpage. Examples of ways to uniquely identify an element on the webpage 309 are described earlier, e.g. based on a unique ID or source ("src") attribute, or based on the unique content in or of the element itself.

In some embodiments, the point associated with the element is an anchor point defined at a particular location within or proximate to the element.

In some embodiments, the cursor on the screen associated with the second user device 330 may be referred to as "a second cursor" (even though it is a cursor associated with the first user), and the method may further include: receiving, from the first user device 320, an indication that a selection is being made with the cursor ("a first cursor") associated with the first user device 320. In some embodiments, subsequent to receiving the indication (e.g. in response to receiving the indication), the method may further include transmitting, to the second user device 330, an instruction to modify the display of the second cursor on the screen associated with the second user device 330. An example of such a modification is illustrated in FIG. 18. In some embodiments, a cursor state associated with the first cursor (e.g. "dragging a file", "sorting a list", etc.) may be transmitted to the second user device 330, and the cursor state may be displayed and/or implemented on the second user device 330.

In some embodiments, the method further includes receiving, from the first user device 320, an indication that content is being displayed on the screen associated with the first user device 320 and that the content is not for display on the screen associated with the second user device 330. In some embodiments, subsequent to receiving the indication (e.g. in response to receiving the indication), the method may further include transmitting, to the second user device 330, an instruction to modify the display of the cursor on the screen associated with the second user device 330.

In some embodiments, the method may include transmitting, to the second user device 330, an instruction to apply a visual effect to the cursor when displaying the cursor on the screen associated with the second user device 330. The visual effect may be to indicate that the user of the first user device 320 is interacting with the first user device 320.

In some embodiments, upon determining that the cursor is stationary for a particular period of time, the method may further include transmitting, to the second user device 330, an instruction to stop displaying the cursor.

In some embodiments, the element is a first element, the distance measurement is a first distance measurement, the point is a first point, and the method further includes receiving from the first user device 320: an identity of a second element on the webpage 309, and a second distance measurement from a second point associated with the second element. The method may further include receiving, from the first user device 320, an indication that: (i) an area is being selected on the screen associated with the first user device 320, and (ii) a first corner of the area is located at the first distance measurement from the first point, and (iii) a second corner of the area is located at the second distance measurement from the second point. The method may further include transmitting to the second user device 330: the identity of the first element, the first distance measurement, the identity of the second element, the second distance measurement, and an instruction to display a visual effect on the screen associated with the second user device 330. In some embodiments, the visual effect shows the selection of the area on the screen associated with the second user device 330. The first point and the second point might or might not be the same point. The first element and the second element might or might not be the same element. FIGS. 19 and 20 illustrate an example in which the first point is equal to the second point and is anchor point 1802c. In the example in FIGS. 19 and 20, the first element equals the second element, and is the field element for entering the email address.

In a variation of the method of FIG. 21, at step 2106 an identity of the point may be used as or instead of the identity of the element, in which case at step 2108 the identity of the point (received from the first user device 320) and the distance measurement are transmitted to the second user device 330.

The method of FIG. 21 may be performed using the components of web server 302, e.g. the memory 308 may store the webpage 309, the processor 304 may generate the instructions (e.g. to display the cursor on the screen associated with the second user device 330), and/or the network interface 306 may transmit and receive to/from the first user device 320 and the second user device 330.

Figure 22:
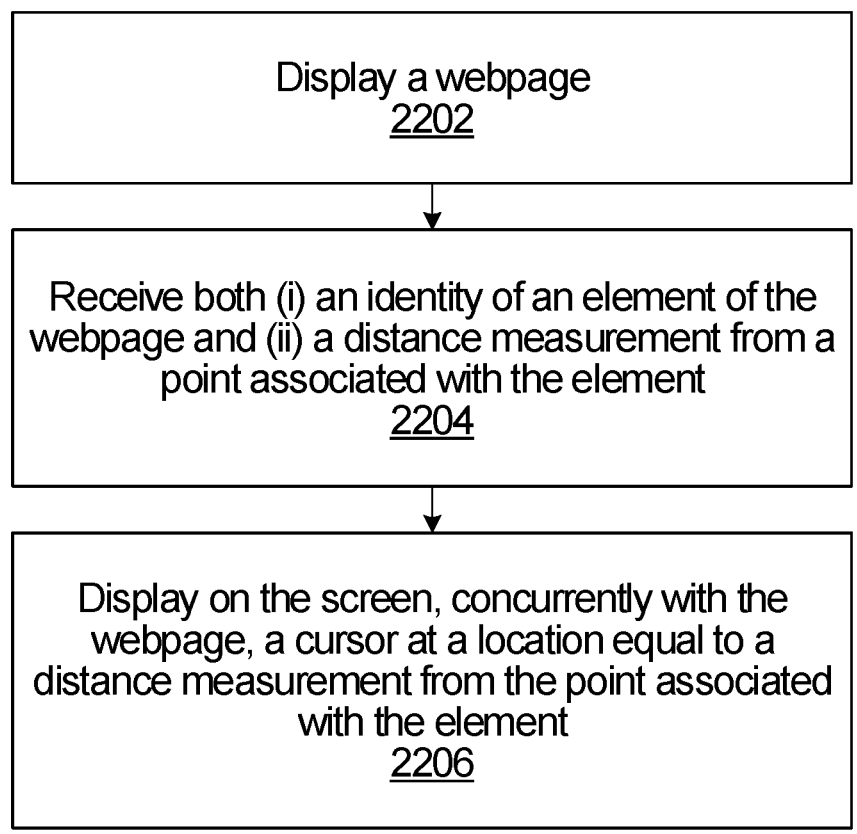
FIG. 22 illustrates a block diagram of a method performed by a user device, according to one embodiment.

FIG. 22 is a method performed by a user device, according to one embodiment. The method of FIG. 22 will be described as being performed by the second user device 330 of FIG. 3, although more generally this need not be the case. For example, the method may be performed by another user device or another computing device.

At step 2202, the second user device 330 displays a webpage (e.g. the webpage 309) on a screen associated with the second user device 330 (e.g. on the display 339).

At step 2204, the second user device 330 receives both (i) an identity of an element of the webpage and (ii) a distance measurement from a point associated with the element. For example, the point may be an anchor point, as described earlier. Examples of types of distance measurements described earlier include relative pixel coordinates (e.g. like described in relation to FIGS. 9 and 10) or distance measurement in terms of percentage (e.g. like described in relation to FIGS. 11 to 12).

At step 2206, the second user device 330 displays on the screen, concurrently with the webpage 309, a cursor at a location equal to a distance measurement from the point associated with the element.

In some embodiments, the identity of the element and the distance measurement are received from the first user device 320, in which case the identity of the element and the distance measurement may be received from the first user device 320 via a server connected between the first user device 320 and the second user device 330 (e.g. as in FIG. 3), or directly from the first user device 320, e.g. if the first user device 320 and the second user device 330 are directly connected via a cable, such as over a local area network, or if the first user device 320 and the second user device 330 directly communicate with each other over a wireline or wireless medium, e.g. via device-to-device (D2D) communication over network 310.

In some embodiments, the second user device 330 applies a visual effect on the display to indicate that: (i) the cursor is associated with a user of a first user device 320 (e.g. like in FIG. 17); and/or (ii) the user of the first user device 320 is interacting with the first user device 320. For example, the visual effect may include displaying an ID of the user of the first user device 320 (like in FIG. 17), and/or causing the cursor to jitter on the screen.

In a variation of the method of FIG. 22, at step 2204 an identity of the point may be used as or instead of the identity of the element, in which step 2204 involves receiving both (i) an identity of the point and (ii) a distance measurement from that point.

The method of FIG. 22 may be performed using the components of the second user device 330, e.g. the processor 332 may generate the instructions (e.g. to display the cursor on the screen display 339 associated with the second user device 330), and/or the network interface 336 may transmit and receive to/from the web server 302 and/or the first user device 320.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:
    transmitting a webpage to a first user device for display on a first screen associated with the first user device;
    transmitting the webpage to a second user device for display on a second screen associated with the second user device, the webpage configured such that the webpage may be displayed with different layouts when rendered for display by different devices on screens associated therewith;
    receiving from the first user device: an identity of an element on the webpage, and a distance measurement representing a relative distance of a first cursor displayed on the first screen from a point associated with the element on the webpage as displayed on the first screen;
    determining, based on a property of the element, whether to represent the distance measurement in terms of pixel coordinates or in terms of a fraction measurement, wherein the determining comprises selecting between the pixel coordinates and the fraction measurement to represent the distance measurement representing the relative distance of the first cursor, the selecting based on whether a size of content of the element is the same or substantially the same across the different layouts and whether the element proportionally scales across the different layouts, and wherein the distance measurement is represented in terms of the fraction measurement when the element has the property that the element proportionally scales across the different layouts, and wherein the distance measurement is represented in terms of the pixel coordinates when the element has the property that the size of content of the element is the same or substantially the same across the different layouts; and
    transmitting to the second user device: the identity of the element, the distance measurement, wherein the distance measurement is represented in terms of the pixel coordinates or the fraction measurement based on the property of the element, and wherein the distance measurement represents the relative distance of the first cursor displayed on the first screen from the point associated with the element on the webpage as displayed on the first screen, and an instruction to display a second cursor on the second screen associated with the second user device at the relative distance from the point associated with the element on the webpage as displayed on the second screen.

2. The method of claim 1, wherein the webpage transmitted to the first user device and the second user device includes an indication of a location of the point.

3. The method of claim 2, wherein the indication of the location of the point is in relation to the element when the element is displayed.

4. The method of claim 1, wherein the distance measurement comprises a first value indicative of a relative distance from the point in a first direction and a second value indicative of a relative distance from the point in a second direction perpendicular to the first direction.

5. The method of claim 4, wherein the distance measurement is represented in terms of the pixel coordinates, wherein the first value is the relative number of the pixel coordinates from the point in a horizontal direction, and the second value is the relative number of the pixel coordinates from the point in a vertical direction.

6. The method of claim 4, wherein the distance measurement is represented in terms of the fraction measurement, wherein the point is a first point, wherein the element is a first element, and wherein:
    the first value is a measurement of horizontal distance from the first point in terms of: percentage of horizontal length of a browser window or percentage of horizontal length of the first element or percentage of horizontal length between the first point and a second point associated with a second element on the webpage; and
    the second value is a measurement of vertical distance from the first point in terms of: percentage of vertical length of a browser window or percentage of vertical length of the first element or percentage of vertical length between the first point and a third point associated with a third element on the webpage.

7. The method of claim 1, wherein the identity of the element uniquely identifies the element from all other elements on the webpage, and wherein the point associated with the element is an anchor point defined at a particular location within or in proximity to the element.

8. The method of claim 1, wherein the method further comprises:
    receiving, from the first user device, an indication that a selection is being made with the first cursor associated with the first user device;
    in response to receiving the indication: transmitting, to the second user device, an instruction to modify the display of the second cursor on the second screen associated with the second user device.

9. The method of claim 1, further comprising:
    receiving, from the first user device, an indication that content is being displayed on the first screen associated with the first user device and that the content is not for display on the second screen associated with the second user device;
    in response to receiving the indication: transmitting, to the second user device, an instruction to modify the display of the second cursor on the second screen associated with the second user device.

10. The method of claim 1, further comprising transmitting, to the second user device, an instruction to apply a visual effect to the second cursor when displaying the second cursor on the second screen associated with the second user device.

11. The method of claim 1, wherein upon determining that the first cursor is stationary for a particular period of time, the method further comprises transmitting, to the second user device, an instruction to stop displaying the second cursor.

12. The method of claim 1, wherein the element is a first element, the distance measurement is a first distance measurement, the point is a first point, and wherein the method further comprises:
    receiving from the first user device: an identity of a second element on the webpage, and a second distance measurement from a second point associated with the second element;
    receiving, from the first user device, an indication that: (i) an area is being selected on the first screen associated with the first user device, and (ii) a first corner of the area is located at the first distance measurement from the first point, and (iii) a second corner of the area is located at the second distance measurement from the second point;
    transmitting to the second user device: the identity of the first element, the first distance measurement, the identity of the second element, the second distance measurement, and an instruction to display a visual effect on the second screen associated with the second user device, the visual effect showing the selection of the area on the second screen associated with the second user device.

13. A server comprising:
a memory to store a webpage;
a network interface to:
    transmit the webpage to a first user device for display on a first screen associated with the first user device;
    transmit the webpage to a second user device for display on a second screen associated with the second user device, the webpage configured such that the webpage may be displayed with different layouts when rendered for display by different devices on screens associated therewith; and
    receive from the first user device: an identity of an element on the webpage, and a distance measurement representing a relative distance of a first cursor displayed on the first screen from a point associated with the element on the webpage as displayed on the first screen;
the server to determine, based on a property of the element, whether to represent the distance measurement in terms of pixel coordinates or in terms of a fraction measurement, wherein the server is to select between the pixel coordinates and the fraction measurement to represent the distance measurement representing the relative distance of the first cursor, the selection based on whether a size of content of the element is the same or substantially the same across the different layouts and whether the element proportionally scales across the different layouts, and wherein the distance measurement is represented in terms of the fraction measurement when the element has the property that the element proportionally scales across the different layouts, and wherein the distance measurement is represented in terms of the pixel coordinates when the element has the property that the size of content of the element is the same or substantially the same across the different layouts; and
the network interface to transmit to the second user device: the identity of the element, the distance measurement, wherein the distance measurement is represented in terms of the pixel coordinates or the fraction measurement based on the property of the element, and wherein the distance measurement represents the relative distance of the first cursor displayed on the first screen from the point associated with the element on the webpage as displayed on the first screen, and an instruction to display a second cursor on the second screen associated with the second user device at the relative distance from the point associated with the element on the webpage as displayed on the second screen.

14. The server of claim 13, wherein the webpage includes an indication of a location of the point.

15. The server of claim 14, wherein the indication of the location of the point is in relation to the element when the element is displayed.

16. The server of claim 13, wherein the distance measurement comprises a first value indicative of a relative distance from the point in a first direction and a second value indicative of a relative distance from the point in a second direction perpendicular to the first direction.

17. The server of claim 16, wherein the distance measurement is represented in terms of the pixel coordinates, wherein the first value is the relative number of the pixel coordinates from the point in a horizontal direction, and the second value is the relative number of the pixel coordinates from the point in a vertical direction.

18. The server of claim 16, wherein the distance measurement is represented in terms of the fraction measurement, wherein the point is a first point, wherein the element is a first element, and wherein:
    the first value is a measurement of horizontal distance from the first point in terms of: percentage of horizontal length of a browser window or percentage of horizontal length of the first element or percentage of horizontal length between the first point and a second point associated with a second element on the webpage; and
    the second value is a measurement of vertical distance from the first point in terms of: percentage of vertical length of a browser window or percentage of vertical length of the first element or percentage of vertical length between the first point and a third point associated with a third element on the webpage.

19. The server of claim 13, wherein the identity of the element uniquely identifies the element from all other elements on the webpage, and wherein the point associated with the element is an anchor point defined at a particular location within or in proximity to the element.

20. The server of claim 13, wherein the network interface is further to:
    receive, from the first user device, an indication that a selection is being made with the first cursor associated with the first user device;
    subsequently transmit, to the second user device, an instruction to modify the display of the second cursor on the second screen associated with the second user device.

21. The server of claim 13, wherein the network interface is further to:
    receive, from the first user device, an indication that content is being displayed on the first screen associated with the first user device and that the content is not for display on the second screen associated with the second user device;
    subsequently transmit, to the second user device, an instruction to modify the display of the second cursor on the second screen associated with the second user device.

22. The server of claim 13, wherein the network interface is to transmit, to the second user device, an instruction to apply a visual effect to the second cursor when displaying the second cursor on the second screen associated with the second user device.

23. The server of claim 13, wherein subsequent to a determination being made that the first cursor is stationary for a particular period of time, the network interface is to transmit, to the second user device, an instruction to stop displaying the second cursor.

24. The server of claim 13, wherein the element is a first element, the distance measurement is a first distance measurement, the point is a first point, and wherein the network interface is further to:
    receive from the first user device: an identity of a second element on the webpage, and a second distance measurement from a second point associated with the second element;
    receive, from the first user device, an indication that: (i) an area is being selected on the first screen associated with the first user device, and (ii) a first corner of the area is located at the first distance measurement from the first point, and (iii) a second corner of the area is located at the second distance measurement from the second point;

transmit to the second user device: the identity of the first element, the first distance measurement, the identity of the second element, the second distance measurement, and an instruction to display a visual effect on the second screen associated with the second user device, the visual effect showing the selection of the area on the second screen associated with the second user device.

25. The method of claim 1, wherein the distance measurement is represented in terms of the fraction measurement when the element is an image.

26. The server of claim 13, wherein the distance measurement is represented in terms of the fraction measurement when the element is an image.

\* \* \* \* \*